United States Patent
da Veiga et al.

(10) Patent No.: US 10,591,974 B2
(45) Date of Patent: *Mar. 17, 2020

(54) DETECTING USER FOCUS ON HINGED MULTI-SCREEN DEVICE

(71) Applicant: Microsoft Technology Licensing, LLC, Redmond, WA (US)

(72) Inventors: Alexandre da Veiga, Seattle, WA (US); Roger Sebastian Sylvan, Seattle, WA (US); Jeffrey Sipko, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,964

(22) Filed: Jun. 6, 2019

(65) Prior Publication Data

US 2019/0286217 A1    Sep. 19, 2019

Related U.S. Application Data

(63) Continuation of application No. 15/347,524, filed on Nov. 9, 2016, now Pat. No. 10,331,190.

(51) Int. Cl.
*G06F 1/16* (2006.01)
*G06F 1/3231* (2019.01)
(Continued)

(52) U.S. Cl.
CPC ............ *G06F 1/3231* (2013.01); *G06F 1/162* (2013.01); *G06F 1/1618* (2013.01); *G06F 1/1647* (2013.01); *G06F 1/1677* (2013.01); *G06F 1/1681* (2013.01); *G06F 1/3265* (2013.01); *G06F 3/011* (2013.01); *G06F 3/012* (2013.01); *G06F 3/017* (2013.01); *G06F 3/0346* (2013.01); *G06F 3/044* (2013.01); *G06F 3/0418* (2013.01); *G06F 3/0484* (2013.01); *G06F 3/0488* (2013.01); *G06F 3/1423* (2013.01);
(Continued)

(58) Field of Classification Search
CPC ...... G06F 1/162; G06F 1/1681; G06F 1/3265; G06F 3/012–013; G06F 3/017; G06F 3/0346; G06F 3/044; G06F 1/1618
USPC .................................................. 345/1.1, 1.3
See application file for complete search history.

(56) References Cited

U.S. PATENT DOCUMENTS

| | | | |
|---|---|---|---|
| 2012/0154294 A1* | 6/2012 | Hinckley | G06F 1/1649 345/173 |
| 2013/0169545 A1* | 7/2013 | Eaton | H04M 1/0241 345/173 |

* cited by examiner

*Primary Examiner* — Michael Pervan
(74) *Attorney, Agent, or Firm* — Alleman Hall Creasman & Tuttle LLP

(57) ABSTRACT

A mobile computing device is provided that includes a processor, an accelerometer, two or more display devices, and a housing including the processor, the accelerometer, and the two or more display devices, determine a current user focus indicating that a first display device of the pair of display devices is being viewed by the user, and that a second display device of the pair of display devices is not being viewed by the user, detect a signature gesture input based on accelerometer data received via the accelerometer detecting that the mobile computing device has been rotated more than a threshold degree, determine that the current user focus has changed from the first display device to the second display device based on at least detecting the signature gesture input, and perform a predetermined action based on the current user focus.

20 Claims, 11 Drawing Sheets

(51) Int. Cl.
*G06F 3/0488* (2013.01)
*G06F 3/14* (2006.01)
*G06F 3/01* (2006.01)
*G06F 3/0484* (2013.01)
*G06F 1/3234* (2019.01)
*G06F 3/0346* (2013.01)
*G06F 3/041* (2006.01)
*G06F 3/044* (2006.01)

(52) U.S. Cl.
CPC ... *G09G 2330/021* (2013.01); *G09G 2354/00* (2013.01); *G09G 2360/144* (2013.01); *Y02D 10/153* (2018.01)

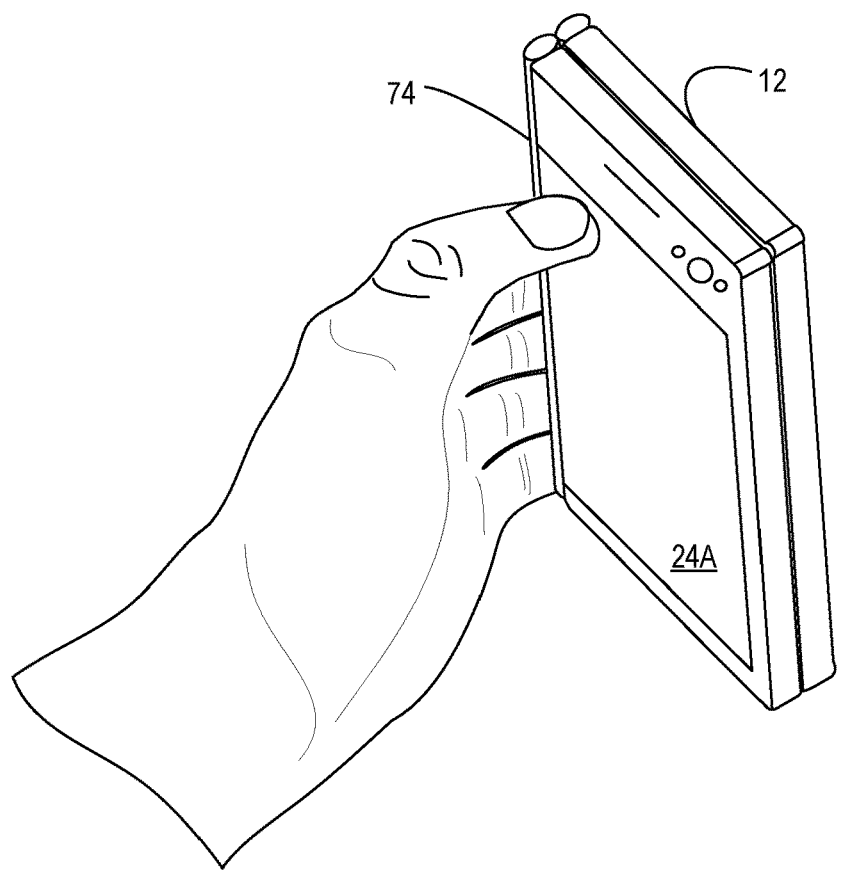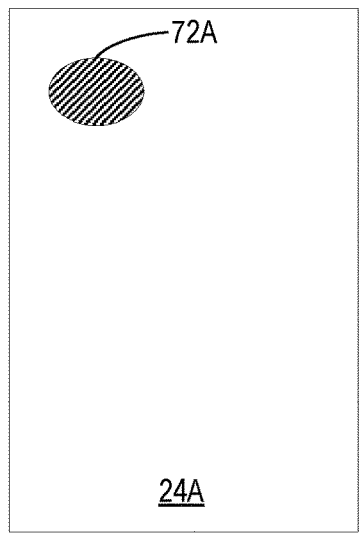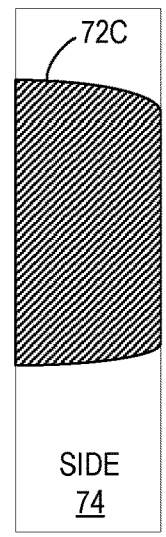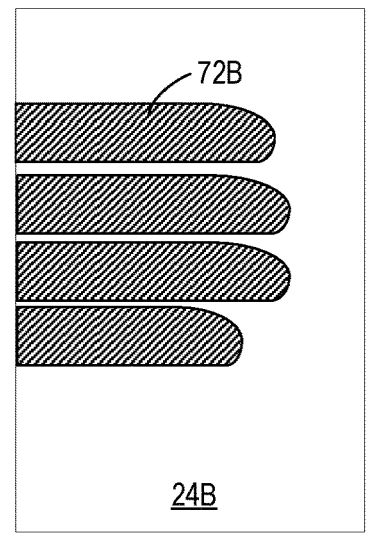
FIG. 6

DETECTING USER FOCUS ON HINGED MULTI-SCREEN DEVICE

CROSS REFERENCE TO RELATED APPLICATIONS

This application is a continuation of U.S. patent application Ser. No. 15/347,524, filed Nov. 9, 2016, the entire contents of which is hereby incorporated herein by reference for all purposes.

BACKGROUND

Users interact with multi-screen mobile devices throughout a variety of positions, including holding the device vertically, holding the device with a primary screen facing toward the user, holding the screen with a second screen facing toward the user, and other positions and orientations. In some positions and orientations of the multi-screen mobile device, one of the screens may be facing away from the user such that the screen is no longer in view of the user. Currently, multi-screen mobile devices may continue to power that screen even though it is not being viewed by the user, which can lead to excessive power usage.

SUMMARY

To address the above issues, a mobile computing device is provided. The mobile computing device may include a processor, an accelerometer, two or more display devices, and a housing including the processor, the accelerometer, and the two or more display devices. The housing may include a hinge between a pair of display devices of the two or more display devices, the hinge being configured to permit the pair of display devices to rotate between angular orientations from a face-to-face angular orientation to a back-to-back angular orientation. The processor may be configured to detect a current angular orientation between the pair of display devices indicating that the pair of display devices are facing away from each other, determine a current user focus indicating that a first display device of the pair of display devices is being viewed by the user, and that a second display device of the pair of display devices is not being viewed by the user, detect a signature gesture input based on accelerometer data received via the accelerometer detecting that the mobile computing device has been rotated more than a threshold degree, determine that the current user focus has changed from the first display device to the second display device based on at least detecting the signature gesture input, and perform a predetermined action based on the current user focus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 shows an example capacitive touch input for the mobile computing device of FIG. 1.

DETAILED DESCRIPTION

As discussed in detail below, hinged multi-screen mobile devices may cause excessive power usage due to powering a screen that is not currently being viewed by the user, may display important content on a display that is not currently being viewed by the user, and may classify a user's fingers touching an unviewed screen as being intended touch input. The systems and methods described herein have been devised to address these challenges.

Figure 1:
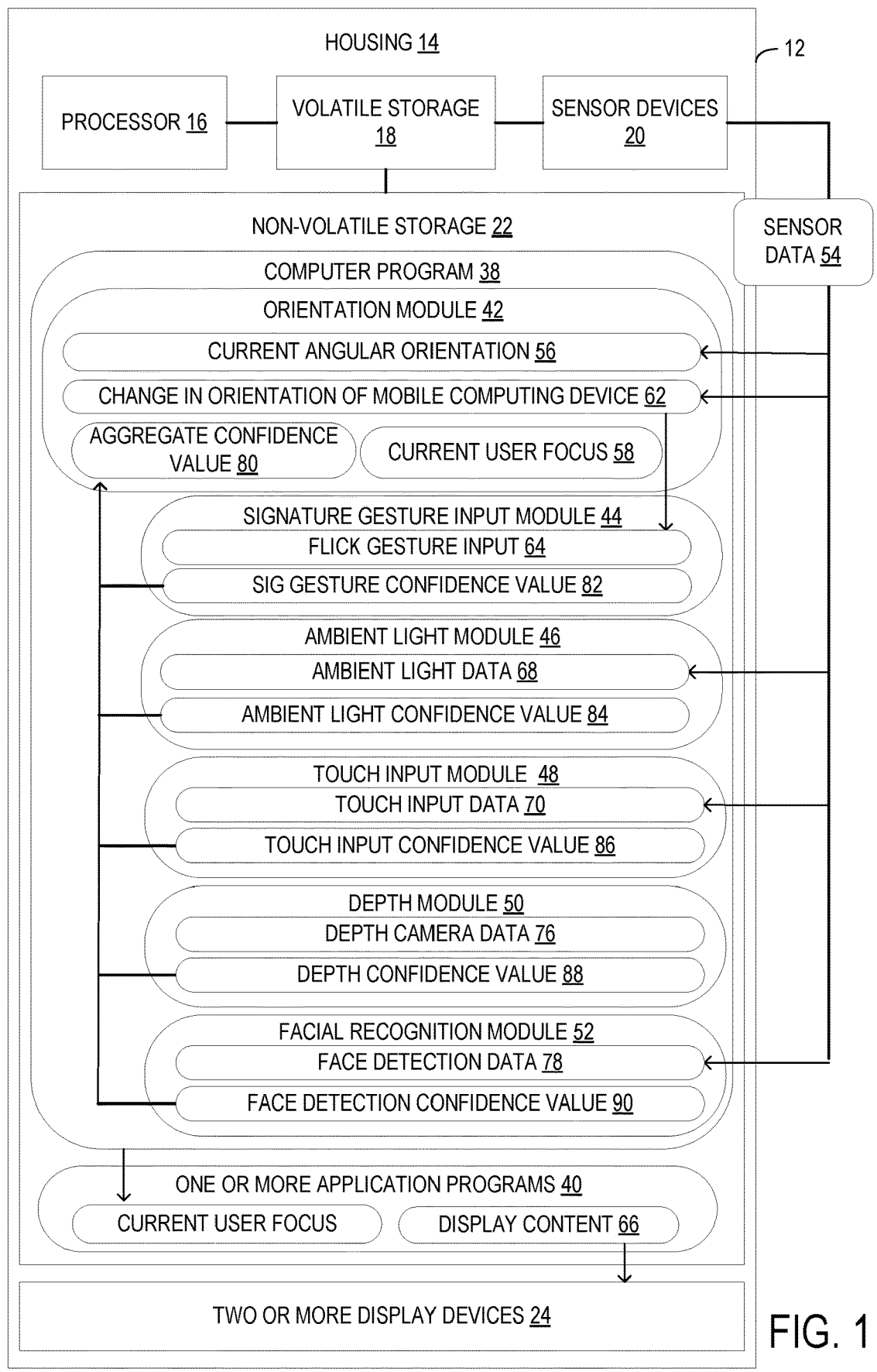
FIG. 1 shows an example mobile computing device of the present description.

FIG. 1 illustrates a mobile computing device 12 that includes a housing 14, which, for example, may take the form of a casing surrounding internal electronics and providing structure for displays, sensors, speakers, buttons, etc. The housing 14 is configured to include a processor 16, volatile storage device 18, sensor devices 20, non-volatile storage device 22, and two or more display devices 24. The sensor devices 20 may include a plurality of different sensors, such as, for example, an accelerometer 26, an ambient light sensor 28, a forward facing camera 30, a depth camera 32, etc. The sensor devices 20 may also include a capacitive touch sensor 34, such as a capacitive array that is integrated with each of the two or more display devices 24. In another example, the sensor devices 20 may include camera-in-pixel sensors that are integrated with each of the two or more display devices 24. It will be appreciated that the examples listed above are exemplary, and that other types of sensors not specifically mentioned above may also be included in the sensor devices 20 of the mobile computing device 12.

The mobile computing device 12 may, for example, take the form of a smart phone device. In another example, the mobile computing device 12 may take other suitable forms, such as a tablet computing device, a wrist mounted computing device, etc.

Figure 2A:
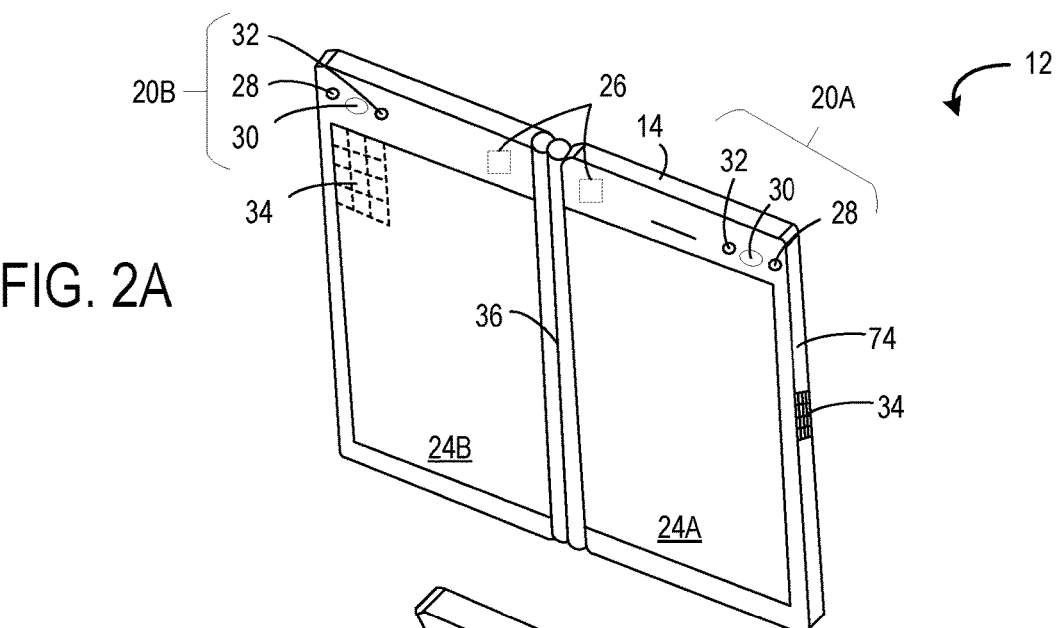
FIG. 2A shows an example of two display screens arranged in a side-by-side orientation for the mobile computing device of FIG. 1.

Turning to FIG. 2A, an example mobile computing device 12 is illustrated. As shown, the example mobile computing device 12 includes a housing 14. As discussed above, the housing 14 may be configured to internally house various electronic components of the example mobile computing device 12, including the processor 16, volatile storage device 18, and non-volatile storage device 22. Additionally, the housing 14 may provide structural support for the display devices 24 and the sensor devices 20. In the illustrated example, the sensor devices 20 include one or more accelerometers 26 that are contained by the housing 14. The sensor devices 20 may further include forward facing cameras 30. In one example, the forward facing cameras 30 include RGB cameras. However, it will be appreciated that other types of cameras may also be included in the forward facing cameras 30. In this example, forward facing is a direction of the camera's associated display device. Thus, in the example of FIG. 2A, as the screens for both of an example pair of display devices 24A and 24B are facing the same direction, both of the forward facing cameras 30 are also facing the same direction. The sensor devices 20 further include an ambient light sensor 28 and a depth camera 32.

As shown, the sensor devices 20 may also include capacitive touch sensors 34 that are integrated with the pair of display devices 24A and 24B, as well as other additional displays. In the illustrated embodiment, the capacitive touch sensors 34 include a capacitive grid configured to sense changes in capacitance caused by objects on or near the display devices, such as a user's finger, hand, stylus, etc. In one embodiment, the capacitive touch sensors 34 may also be included on one or more sides of the mobile computing device 12. For example, the capacitive touch sensors 34 may be additionally integrated into the sides of the housing 14 of the mobile computing device 12. While the capacitive touch sensors 34 are illustrated in a capacitive grid configuration, it will be appreciated that other types of capacitive touch sensors and configurations may also be used, such as, for example, a capacitive diamond configuration. In other examples, the sensor devices 20 may include camera-in-pixel devices integrated with each display device including the pair of display devices 24A and 24B. It will be appreciated that the sensor devices 20 may include other sensors not illustrated in FIG. 2A.

In the example mobile computing device 12 illustrated in FIG. 2A, the two example display devices 24A and 24B are movable relative to each other. As shown, the example mobile computing device 12 includes a house 14 including the processor 16, the accelerometer 26, and the two or more display devices 24, the housing including a hinge 36 between a pair of display devices 24A and 24B of the two or more display devices 24, the hinge 36 being configured to permit the pair of display devices 24A and 24B to rotate between angular orientations from a face-to-face angular orientation to a back-to-back angular orientation.

Figure 2B:
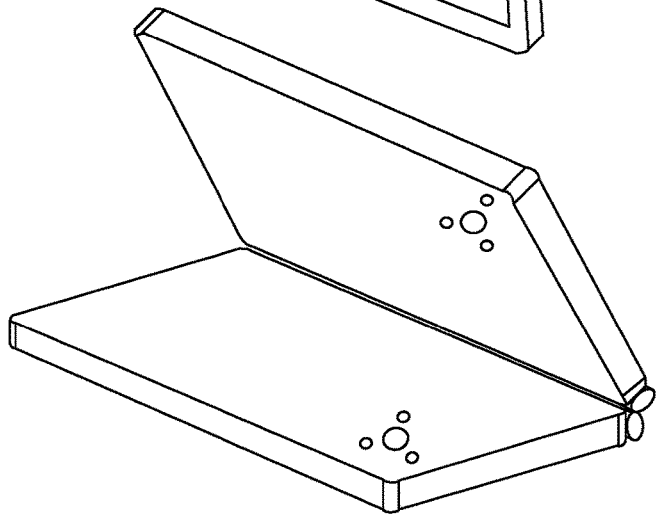
FIG. 2B shows an example of two display screens arranged in an obtuse orientation for the mobile computing device of FIG. 1.

Now turning to FIG. 2B, the hinge 36 permits the pair of display devices 24A and 24B to rotate relative to one another such that an angle between the pair of display devices 24A and 24B can be decreased or increased by the user via applying suitable force to the housing 14 of the mobile computing device 12. As shown in FIG. 2B, the pair of display devices 24A and 24B may be rotated until the pair of display devices 24A and 24B reach a back-to-back angular orientation as shown in FIG. 2C.

Figures 2C, 2D:
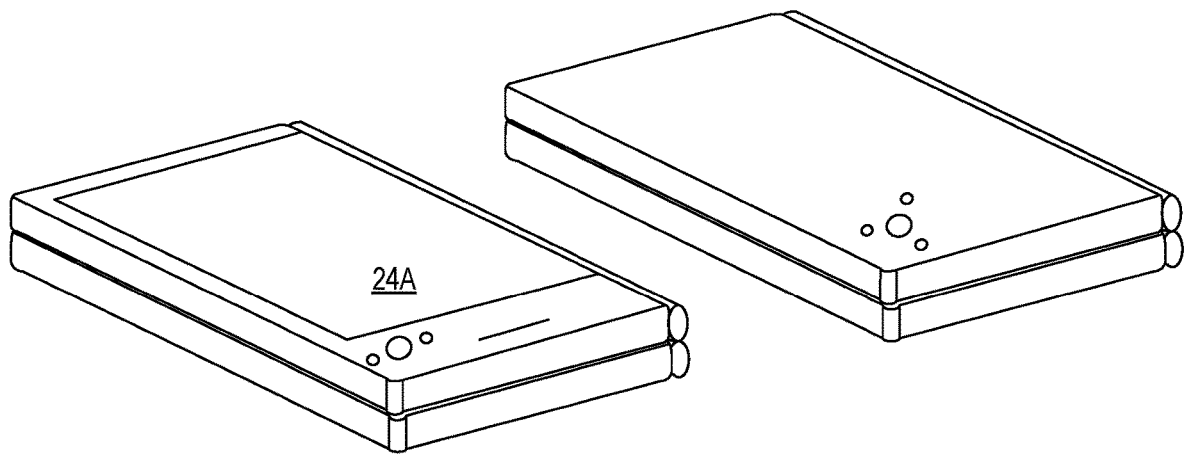
FIG. 2C shows an example of two display screens arranged in a back-to-back orientation for the mobile computing device of FIG. 1.
FIG. 2D shows an example of two display screens arranged in a front-to-front orientation for the mobile computing device of FIG. 1.

As illustrated in FIG. 2C, while in an angular orientation where the pair of display devices 24A and 24B are in a back-to-back angular orientation, the pair of display devices 24A and 24B face away from each other. Thus, while using the mobile computing device 12, the user may only be able to view one of the display devices of the pair of display devices 24A and 24B at a time. Additionally, while in a back-to-back angular orientation, sensor packages 20A and 20B of the sensor devices 20, which may each include ambient light sensors 28, forward facing cameras 30, and depth cameras 32, also face in the same direction as their respective display device, and thus also face away from each other.

As shown in FIG. 2D, the angular orientation between the pair of display devices 24A and 24B may also rotate to a face-to-face orientation where the pair of display devices face each other. Such an angular orientation may help protect the screens of the display devices.

Turning back to FIG. 1, the processor 16 is configured to execute a computer program, which, for example, may be an operating system or control program for the mobile computing device, and one or more application programs 40 stored on the non-volatile storage device 22, and to enact various control processes described herein. In some examples, the processor 16, volatile storage device 18, and non-volatile storage device 22 are included in a System-On-Chip configuration.

The computer program 38 executed by the processor 16 includes an orientation module 42, a signature gesture input module 44, an ambient light module 46, a touch input module 48, a depth module 50, and a face recognition module 52. As shown in FIG. 1, the orientation module 42 is configured to receive sensor data 54 from the sensor devices 20. Based on the sensor data 54, the orientation module 42 is configured to detect a current angular orientation 56 between the pair of display devices 24A and 24B indicating that the pair of display devices 24A and 24B are facing away from each other. As discussed previously, the angular orientation between the pair of display devices 24A and 24B may rotate through angular orientations between a face-to-face angular orientation to a back-to-back angular orientation. Thus, the orientation module 42 is configured to detect a current angular orientation 56 indicating that the pair of display devices 24A and 24B are facing away from each other, such as a back-to-back angular orientation.

The orientation module 42 may be configured to detect the current angular orientation 56 based on different types of sensor data. In one embodiment, the sensor data 54 may include accelerometer data received via the accelerometers 26. As the user applies force to the housing 14 of the mobile computing device 12 to rotate the pair of display devices 24A and 24B, the accelerometers 26 will detect the resulting movement. Thus, based on accelerometer data for a new rotation and a previously known angular orientation between the pair of the display devices 24A and 24B, the orientation module 42 may calculate a new current angular orientation 56 resulting after the user 60 rotates the pair of display devices 24A and 24B. However, it will be appreciated that the current angular orientation 56 may also be calculated via other suitable methods. For example, the sensor devices 20 may further include a hinge sensor in the hinge 36 that is configured to detect an angular orientation of the hinge 36, and thereby detect a current angular orientation of the pair of display devices 24A and 24B.

As discussed above, while in a back-to-back angular orientation, a user may only be able to view one of the display devices of the pair of display devices 24A and 24B at a time. Thus, when the orientation module 42 detects that the current angular orientation 56 is such an orientation, the computer program 38 is further configured to determine a current user focus 58 indicating that a first display device of the pair of display devices 24A and 24B is being viewed by the user, and that a second display device of the pair of display devices 24A and 24B is not being viewed by the user.

Figure 3:
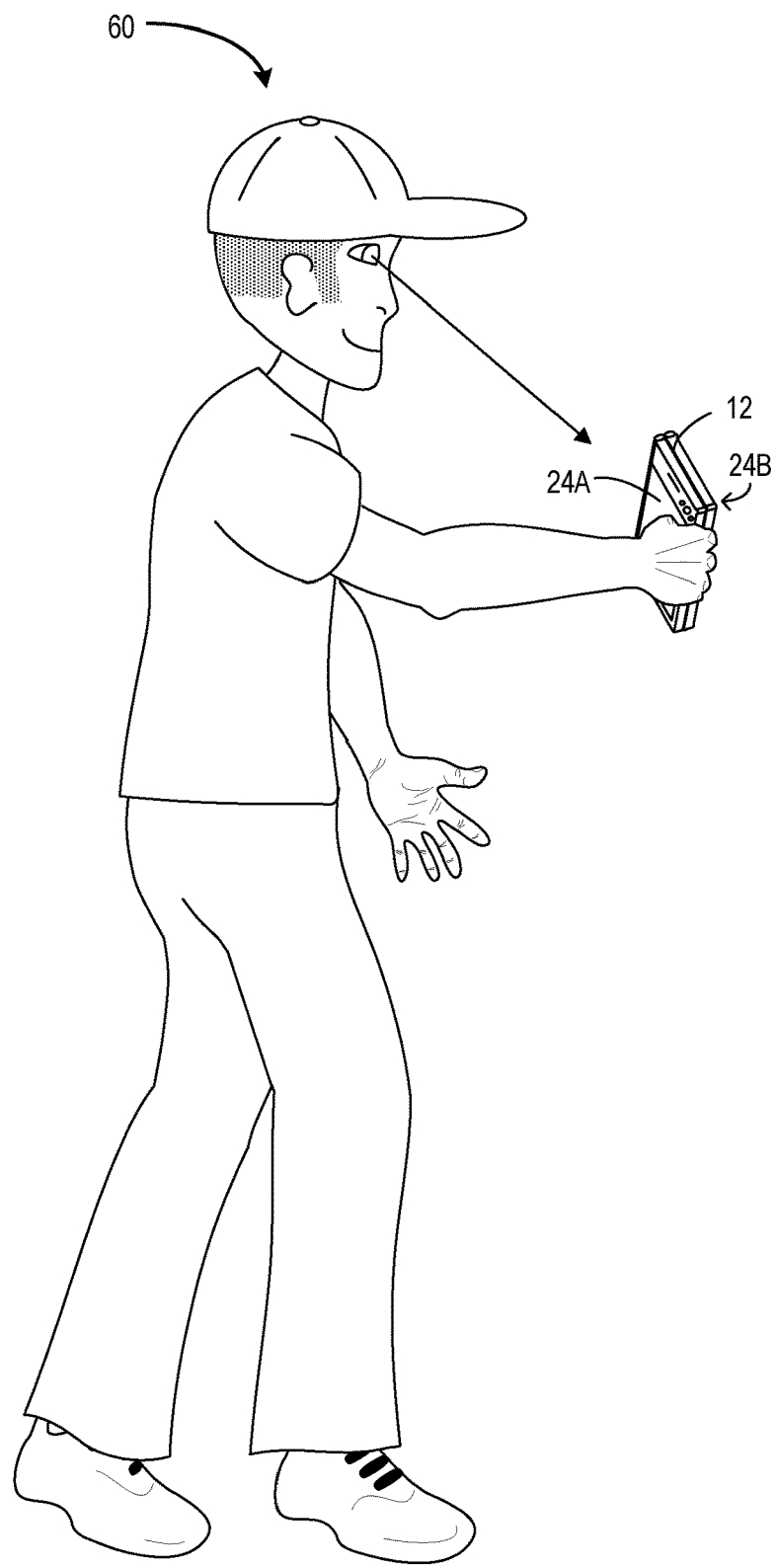
FIG. 3 shows an example display screen having a current user focus for the mobile computing device of FIG. 1.

Turning briefly to FIG. 3, a user 60 is currently viewing the mobile computing device 12. In the illustrated example, the pair of display devices 24A and 24B of the mobile computing device 12 are in a back-to-back angular orientation, thus the user 60 is only able to view a single one of those displays at a time. As shown, in this example, the first display device being viewed by the user is display device 24A, and the second display device not being viewed by the user 60 is the display device 24B. However, it will be appreciated that in other examples, the user 60 may instead be viewing display device 24B and not viewing display device 24A of the pair of display devices.

The computer program 38 is configured to determine the current user focus 58 via several methods and sensors discussed herein. After determining the current user focus 58, the computer program 38 may perform a predetermined action based on the current user focus. In one embodiment, the predetermined action includes turning off a display device that is not being viewed by the user. Thus, to perform the predetermined action, the processor is further configured to reduce a power usage of a display device that does not have the current user focus 58. In this manner, if the user flips the mobile computing device 12 to the other side and begins viewing a different display screen, the computer program 38 may turn that display device on or otherwise increase its power usage, and also turn off or otherwise decrease the power usage of the display device that is no longer being viewed by the user. By powering only the display devices being currently viewed by the user, and turning off or reducing a power usage of display devices not being viewed by the user, the computer program 38 executed by the processor 16 of the mobile computing device 12 may conserve battery power and thus operate more efficiently without impacting the user experience.

As discussed previously, the processor 16 may also be configured to execute one or more application programs 40, which, for example, may include various applications such as mobile games, map applications, other first or second party applications, etc. Operation of the one or more application programs 40 may be improved by knowing which display device of the two or more display devices 24 has the current user focus 58. Thus, the computer program 38 executed by the processor 16 may be configured to provide the current user focus 58 to the one or more application programs 40 via an application program interface. Accordingly, in one embodiment, to perform the predetermined action, the processor 16 is further configured to send the current user focus 58 to the one or more application programs 40.

As a specific example, the one or more application programs 40 may include an augmented reality game application that augments images taken from a forward facing camera 30 of the mobile computing device 12 with various digital objects, and displays the augmented images to the user via one of the display devices. Operation of such an augmented reality game application would be improved by knowing which display device of the two or more display devices 24 has the current user focus 58. For example, the augmented reality game application may augment images captured by a first camera associated with a first display device that does not have the current user focus, and is thus likely to be facing away from the user, and display the augmented images on a second display device that does have the current user focus. In this manner, when the user flips the mobile computing device 12 to the other side such that the current user focus 58 switches from the second display device to the first display device, the processor 16 may send the new current user focus to the augmented reality game application. Upon receiving the new current user focus, the augmented reality game application may switch to augmenting images taken by the second camera associated with the second display device that is now facing away from the user, and display the augmented images on the first display device that now has the current user focus in this specific example.

In one example, the computer program 38 executed by the processor 16 may be further configured to allow input to the display device being viewed by the user, and suppress input to display devices that are not being viewed by the user. For example, as shown in FIG. 3, the user's fingers are touching the screen of the display device 24B while the user is holding the mobile computing device 12 and viewing the screen of display device 24A. Thus, the capacitive touch sensor 34 integrated in the display device 24B may register unintentional touch inputs from the user's fingers as the user holds the mobile computing device 12. Accordingly, in this example, to perform the predetermined action, the processor 16 is further configured to suppress touch input received by a capacitive touch sensor 34 of a display device that does not have the current user focus 58. For example, to suppress touch input, the processor 16 may be configured to ignore any touch input received by the capacitive touch sensor 34 of the one or more display devices 24 that do not have the current user focus.

Figure 4:
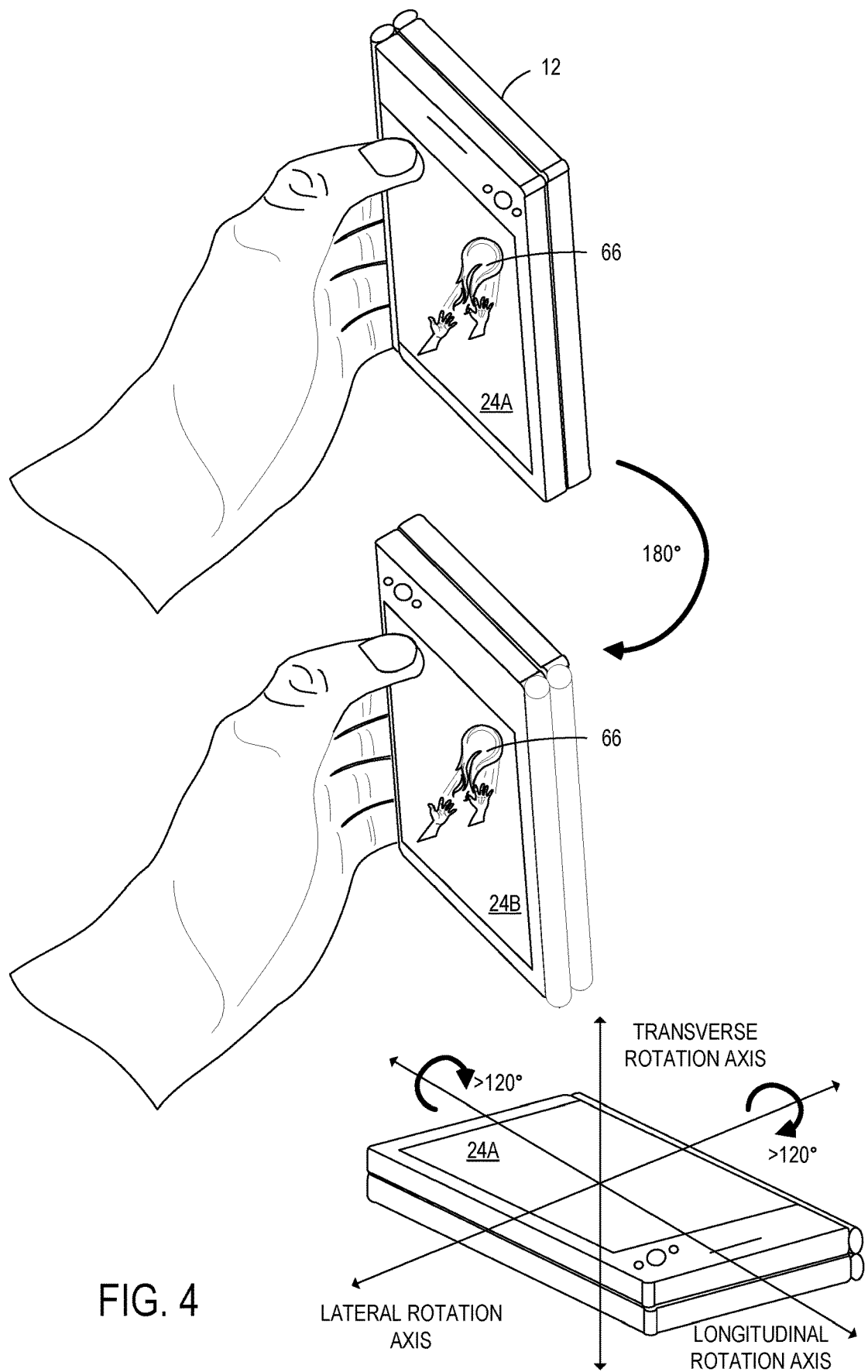
FIG. 4 shows an example flick gesture input for the mobile computing device of FIG. 1.

As discussed previously, the current user focus 58 may change as the user 60 operates the mobile computing device 12. Turning to FIG. 4, the user 60 is initially viewing the display device 24A of the pair of display devices 24A and 24B. Thus, as the current angular orientation is a back-to-back angular orientation and the pair of display devices 24A and 24B are facing away from each other, the current user focus 58 indicates that the user is viewing the display device 24A and is not viewing the display device 24B. However, as shown in FIG. 4, the user 60 flips the mobile computing device one hundred and eighty degrees in a longitudinal rotation axis. In this example, a longitudinal rotation axis is an axis that extends lengthwise, or top to bottom, across the mobile computing device 12 when in a back-to-back or front-to-front angular orientation, as shown in FIG. 4. Further, a lateral rotation axis extends side-to-side across the mobile computing device, and a transverse rotation axis extends orthogonally to both the longitudinal and lateral rotation axes in a thickness direction of the mobile computing device 12. It will be appreciated that these axes are defined relative to the mobile computing device 12.

As shown in FIG. 4, rotations around the longitudinal rotation axis or the lateral rotation axis will cause the mobile computing device 12 to be flipped to the other side, while rotations around the transverse rotation axis will spin the mobile computing device through portrait and landscape orientations. Thus, it will be appreciated that only rotations around substantially lateral or longitudinal rotation axes will cause a change to the current user focus 58.

The orientation module 42 of the computer program 38 executed by the processor 16 is configured to detect a change in orientation 62 of the mobile computing device 12 based on the sensor data 54 received via sensor devices 20. For example, the orientation module 42 may detect and calculate changes in orientation of the mobile computing device 12 based on accelerometer data received via the accelerometers 26. The changes in orientation 62 detected by the orientation module 42 include rotations around each of the rotation axes. Additionally, as shown in FIG. 1, the changes in orientation 62 of the mobile computing device 12 are sent to the signature gesture input module 44.

The signature gesture input module 44 is configured to determine whether any changes in orientation of the mobile computing device 12 match predetermined signature gesture inputs. For example, the signature gesture inputs include a flick gesture input, which is a change in orientation that causes the mobile computing device 12 to be flipped or substantially flipped to the other side, thus resulting in a change in which a different display device of the two or more display devices 24 is being viewed by the user. Thus, the signature gesture input module of the computing program 38 executed by the processor 16 is configured to detect a signature gesture input, including a flick gesture input 64, based on accelerometer data received via the accelerometer 26 indicating that the mobile computing device 12 has been rotated more than a threshold degree. In one example, the threshold degree is set at one hundred and twenty degrees. Thus, if the change in orientation 62 of the mobile computing device 12 determined by the orientation module 42 is greater than one hundred and twenty degrees, the signature gesture input module 44 detects the flick gesture input 64. However, it will be appreciated that other threshold degrees may be set depending upon a desired sensitivity, such as, for example, one hundred degrees or one hundred and eighty degrees.

Additionally, as discussed above, rotations around a transverse rotational axis of the mobile computing device 12 would not result in the mobile computing device 12 being flipped to an opposite side. Thus, in one example, to detect the signature gesture input, such as the flick gesture input 64, the processor 16 is further configured to detect a rotation axis around which the mobile computing device 12 has been rotated more than the threshold degree based on accelerometer data received via the accelerometer 26. The signature gesture input module of the computer program 38 executed by the processor 16 is further configured to detect the signature gesture input based on at least detecting a longitudinal or lateral rotation axis. Accordingly, if the signature gesture input module 44 detects that the rotation occurred around the transverse rotation axis of the mobile computing device 12, the signature gesture input module 44 may be configured to determine that the flick gesture input 64 of the signature gesture inputs has not occurred.

The computer program 38 is further configured to determine that the current user focus 58 has changed from the first display device to the second display device based on at least detecting the signature gesture input, such as the flick gesture input 64. As shown in the example of FIG. 4, the user 60 has rotated the mobile computing device 12 one hundred and eighty degrees around the longitudinal axis, thus resulting in the mobile computing device 12 being flipped to the opposite side. Accordingly, after rotating the mobile computing device 12, the first display device, which was display device 24A, will be facing away from the user while the second display device, which was display device 24B, will be facing toward the user. Thus, the current user focus 58 will have changed from the first display device to the second display device, as the user 60 will now be viewing the second display device and not viewing the first display device. It will be appreciated that the same outcome will have occurred if the user rotated the phone around the lateral axis. On the other hand, if the user 60 rotated the mobile computing device 12 around the transverse axis, the phone would have merely rotated through portrait and landscape orientations, and the current user focus 58 will not have changed.

As discussed previously, upon detecting that the current user focus has changed 58, the computer program 38 executed by the processor 16 of the mobile computing device 12 may perform a predetermined action. In the example of FIG. 4, the computer program 38 may turn off or otherwise reduce the power usage of the first display device, which is the display device 24A in this example, and turn on or otherwise increase the power usage of the second display device, which is the display device 24B in this example.

As further illustrated in the example of FIG. 4, the computer program 38 executed by the processor 16 is further configured to display content 66 on the first display device that has the current user focus 58. In this specific example, the content 66 being displayed is from a movie played by a media player application program of the one or more application programs 40 executed by the processor 16 of the mobile computing device 12. As shown, the movie is shown on the first display device that has the current user focus 58, which is the display device 24A in the illustrated example. In order to reduce power consumption, the move is not shown on the second display device that does not have the current user focus 58, which is the display device 24B.

However, after the user 60 flips the mobile computing device 12, and the signature gesture input module 44 detects that the flick gesture input of the signature gesture inputs has occurred, the computer program 38 determines that the current user focus 58 has changed from the display device 24A to the display device 24B. Thus, the computer program 38 performs one or more predetermined actions, including turning on or otherwise increasing the power usage of the display device 24B that now has the current user focus. Additionally, in this example, to perform the predetermined action, the processor 16 is further configured to, based on at least determining that the current user focus 58 has changed from the first display device to the second display device, switch display of the content 66 from the first display device to the second display device. In the illustrated example, display of the movie is switched from the display device 24A to the display device 24B as the user rotates the mobile computing device 12 around the longitudinal axis over the threshold degree. In this manner, as the movie is only displayed on one screen at a time, power usage of the pair of display devices 24A and 24B, is minimized without impacting the user's experience of viewing the content 66.

Figure 5:
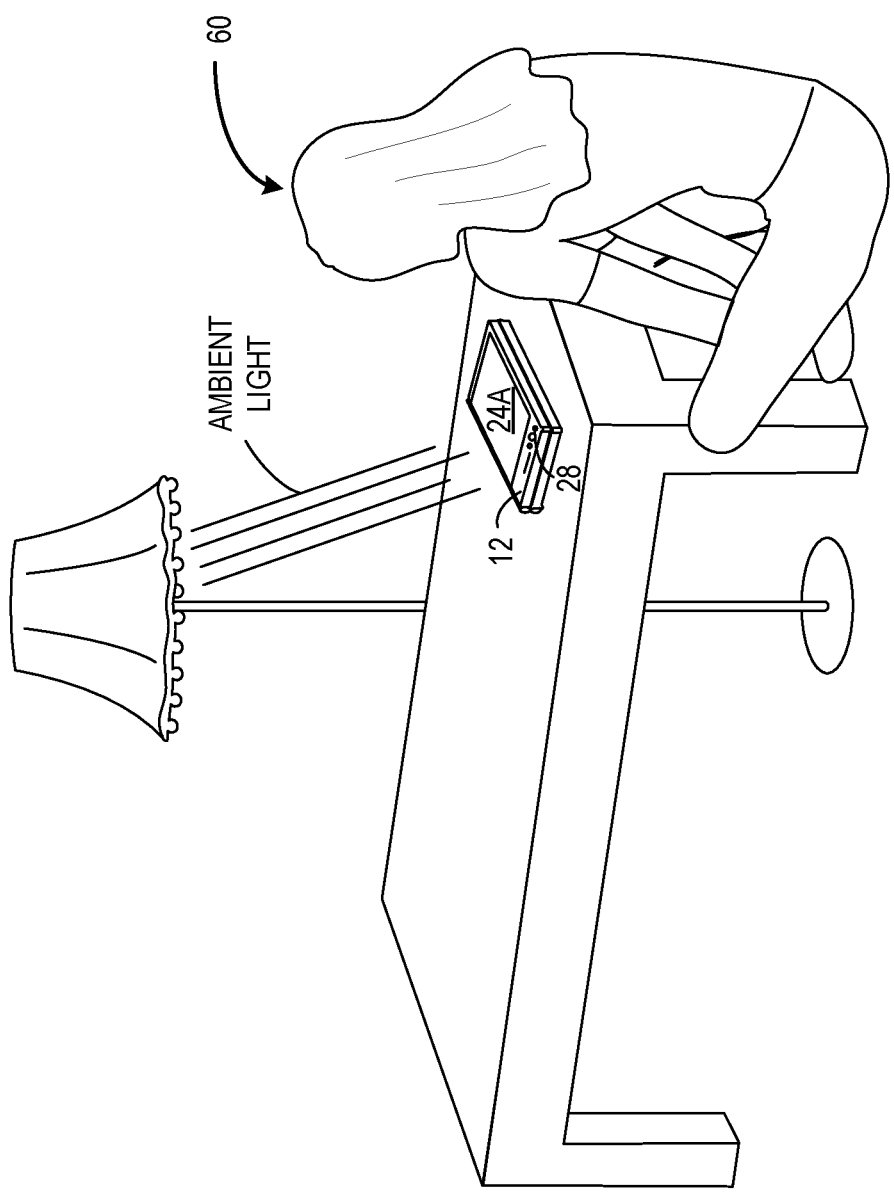
FIG. 5 shows an example ambient light input for the mobile computing device of FIG. 1.

In some examples, the computer program 38 may be configured to determine the current user focus 58 based on different types of sensor data 54 received by the sensor devices 20. Turning to FIG. 5, an example mobile computing device 12 is resting on top of a table. As shown, the pair of display devices 24A and 24B have a back-to-back angular orientation. Thus, the first display device, display device 24A in this example, is facing upwards and is being viewed by the user 60. On the other hand, the second display device, display device 24B in this example, is facing downward toward the table, and is not being viewed by the user. As discussed previously, the sensor devices 20 of the mobile computing device 12 may further include an ambient light sensor 28. Additionally, each display device of the two or more display devices has an associated ambient light sensor 28 facing in substantially the same direction as a screen of that display device. Thus, the second display device, display device 24B in this example, has an associated ambient light sensor 28 that is also facing downward toward the table, and the first display device, display device 24A in this example, has an associated ambient light sensor 28 that is facing upward.

In the illustrated example, the ambient light sensor 28 facing upward toward the room and toward the user 60 will detect ambient light in the room. Whereas, the ambient light sensor 28 facing downward toward the table will be blocked by the table and housing 14, and thus will not detect ambient light, or will at least detect less ambient light than the upward facing ambient light sensor. Accordingly, in one example, to determine the current user focus 58, the processor 16 is further configured to detect a first ambient light level for a surrounding in front of the first display device and a second ambient light level for a surrounding in front of the second display device. The ambient light module 46 of the computer program 38 executed by the processor 16 may detect the ambient light levels for each ambient light sensor 28 based on ambient light data 68 included in the sensor data 54 received via the sensor devices 20, which includes the ambient light sensors 28. In the example of FIG. 5, the first display device is the display device 24A, and the second display device is the display device 24B. Thus, an ambient light sensor 28 for the first display device will detect a relatively higher ambient light than an ambient light sensor 28 for the second display device. The processor 16 is further configured to determine that the first ambient light level is above a threshold light level and that the second ambient light level is below the threshold light level. As the first ambient light level is above the threshold light level, it is likely that the first display device is facing upward toward the room, and therefore toward the user 60. Likewise, since the second ambient light level is below the threshold light level, it is likely that the second display device is facing toward the table, or some other surface that is blocking the ambient light sensor 28 from detecting a surrounding ambient light. Thus, the processor 16 is further configured to, based on at least determining that the first ambient light level is above the threshold light level, determine that the first display device has the current user focus 58, and based on at least determining that the second ambient light level is below the threshold light level, determine that the second display device does not have the current user focus 58. However, it will be appreciated that in some scenarios, both ambient light sensors 28 will detect ambient light levels below the threshold light level. For example, the user 60 may be sitting in a dark room. Thus, in these examples, other types of sensor devices 20 may need to be utilized to determine the current user focus 58.

Turning to FIG. 6, as discussed previously, the two or more display devices 24 each include a capacitive touch sensor 34 configured to receive touch input. The touch input module 48 of the computer program 38 executed by the processor 16 is configured to detect and process the touch input based on touch input data 70 included in the sensor data 54 received via the sensor devices 20 including the capacitive touch sensors 34. In the example illustrated in FIG. 6, the pair of display devices 24A and 24B each have their own integrated capacitive touch sensors. The user 60 is currently holding the mobile computing device 12 in the user's left hand. As shown, the act of holding the mobile computing device 12 will result in a recognizable pattern of capacitive inputs to the capacitive touch sensors of each display device. In particular, because the user 60 is gripping the mobile computing device 12 with their left hand, capacitive touch sensors 34 of the second display device, display device 24B in this example, will detect touch inputs resulting from the user's palm and fingers. On the other hand, the capacitive touch sensors 34 of the first display device, display device 24A in this example, will detect touch inputs resulting from the user's thumb, or in some cases a finger from the opposite hand that is interacting with the screen of the first display device. Thus, such a pattern of a point touch input to the first display device and a larger blob-like touch input to the second display device resulting from the user's palm and fingers cradling the mobile computing device 12, would suggest that the user is currently viewing and interacting with the first display device, which is display device 24A in this example.

In one example, to determine the current user focus 58, the processor 16 is further configured to detect a first touch input 72A via a capacitive touch sensor 34 of the first display device and a second touch input 72B via a capacitive touch sensor 34 of the second display device. As discussed above, in the example illustrated in FIG. 6, the first touch input 72A is a point touch input that characterizes inputs received by the tips of a user's thumb or finger, or a stylus input. Thus, these types of point touch inputs are likely to be intended touch inputs from the user to interact with content displayed on the display device. On the other hand, the second touch input 72B has a larger more irregular shape with blob-like characteristics that are indicative of incidental touch inputs resulting from the user's palm and fingers gripping the mobile computing device 12. Thus, the processor 16 is further configured to determine that the first touch input 72A is an intended touch input and the second touch input 72B is an incidental touch input, based on the size, shape, and other characteristics of each touch input in the touch input data 70 detected by the capacitive touch sensors. It will be appreciated that other methods may be utilized to classify a touch input as intended touch input or incidental touch input, such as, for example, based on a total capacitance of each touch input, or a perimeter to area ratio of each touch input.

The processor 16 is further configured to, based on at least determining that the first touch input 72A is an intended touch input, determine that the first display device has the current user focus 58. It will be appreciated that the display device receiving intended touch input from the user 60 is likely to be the display device that the user 60 is currently viewing. Additionally, the processor 16 is further configured to determine, based on at least determining that the second touch input 72B is an incidental touch input, that the second display device does not have the current user focus 58. In the illustrated example, the second touch input 72B is an incidental touch input indicative of the user gripping the mobile computing device 12 around the back of the mobile computing device 12, and thus the second display device located at the back of the mobile computing device 12 in the illustrated example is unlikely to be currently viewed by the user 60.

In one example, a side 74 of the mobile computing device 12 includes a capacitive touch sensor 34 configured to receive touch input. In some examples, each side of the mobile computing device 12, including the top and bottom sides, may each have an integrated capacitive touch sensor 34. In the example illustrated in FIG. 6, the capacitive touch sensor 34 of the side 74 of the mobile computing device 12 detects a third touch input 72C. Similarly to the second touch input 72B, the third touch input 72C is also an incidental touch input resulting from the user's palm and fingers gripping around the side and back of the mobile computing device 12. As shown in FIG. 6, by detecting three touch inputs, the processor 16 may determine specifically how the user 60 is holding the mobile computing device 12. In the illustrated example, the processor 16 detects an intended touch input to display device 24A as the first touch input 72A, an incidental touch input to display device 24B as the second touch input 72B, and another incidental touch input to a side 74, which is the left side of the mobile computing device 12 in this example, as the third touch input 72C. Thus, the processor 16 may determine that it is likely that the user 60 is holding the mobile computing device 12 with the user's left hand, such that the first display device, display device 24A in this example, is facing toward the user 60. In another example, if the third touch input was detected at a right side of the mobile computing device 12, the processor 16 may determine that it is likely that the user 60 is holding the mobile computing device 12 with the user's right hand.

In yet another example, the processor 16 may detect incidental touch inputs to both the left side and the right side of the mobile computing device that is indicative of the user 60 gripping the mobile computing device 12 completely around the back such that the user's palm is touching the left side and the tips of the user's fingers are touching the right side of the mobile computing device 12. According, if the processor 16 further detects incidental touch input on the second display device, display device 24B in this example, the processor 16 may determine with a high confidence, that it is likely that the user 60 is not viewing the second display device.

Thus, according to the process discussed above, to determine the current user focus 58, the processor 16 is further configured to detect a third touch input 72C via a capacitive touch sensor 34 of the side 74 of the mobile computing device 12. Next, the processor 16 is configured to determine an orientation of the mobile computing device 12 based on at least the first touch input 72A, the second touch input 72B, and the third touch input 72C, and determine the current user focus 58 based on at least the determined orientation of the mobile computing device 12. For example, if the processor 16 determines that the first touch input 72A to a first display device is an intended touch input, the second touch input 72B to a second display device is an incidental touch input, and the third touch input 72C to a left side of the mobile computing device 12 is also an incidental touch input, the processor 16 may determine that the user is holding the mobile computing device 12 in the user's left hand with the first display device facing toward the user. Thus, the first display device would be determined to have the current user focus 58, and the second display device would be determined to not have the current user focus 58.

It will be appreciated that there are a multitude of ways that the user 60 may hold the mobile computing device 12. For example, the user 60 may hold the mobile computing device with both hand, or by only the sides of the mobile computing device, etc. However, each of these ways of holding the mobile computing device 12 will cause a corresponding pattern to be detected by the capacitive touch sensors 34 integrated into the display devices and sides of the mobile computing device 12. By determining such a pattern, the processor 16 may determine how the user 60 is holding the mobile computing device, and thus determine which display device has the current user focus 58. Further, in one example, the processor 16 may process and store patterns of how a specific user 60 typically holds the mobile computing device 12. For example, a user 60 may typically hold the mobile computing device 12 in the user's left hand with the first display device facing toward the user 60. Thus, the resulting pattern may be stored in non-volatile memory, and the processor 16 may determine with a high confidence that the first display device 12 has the current user focus when that specific touch input pattern is detected. Over time, the mobile computing device 12 may develop a database of the different common ways that a specific user typically holds the mobile computing device 12.

However, it will be appreciated that because there are a multitude of ways that a user 60 could be holding the mobile computing device 12, the processor 16 may not be able to determine exactly how the user is holding the mobile computing device 12 with a high confidence. For example, a user with long enough fingers may potentially grip the mobile computing device 12 by both the left and right side without touching any of the two or more display devices 12. In such a scenario, the processor 16 may not be able to determine which specific display device is facing toward the user 60. Thus, the processor 16 may utilize other sensor devices 20 to determine the current user focus 58.

Figure 7:
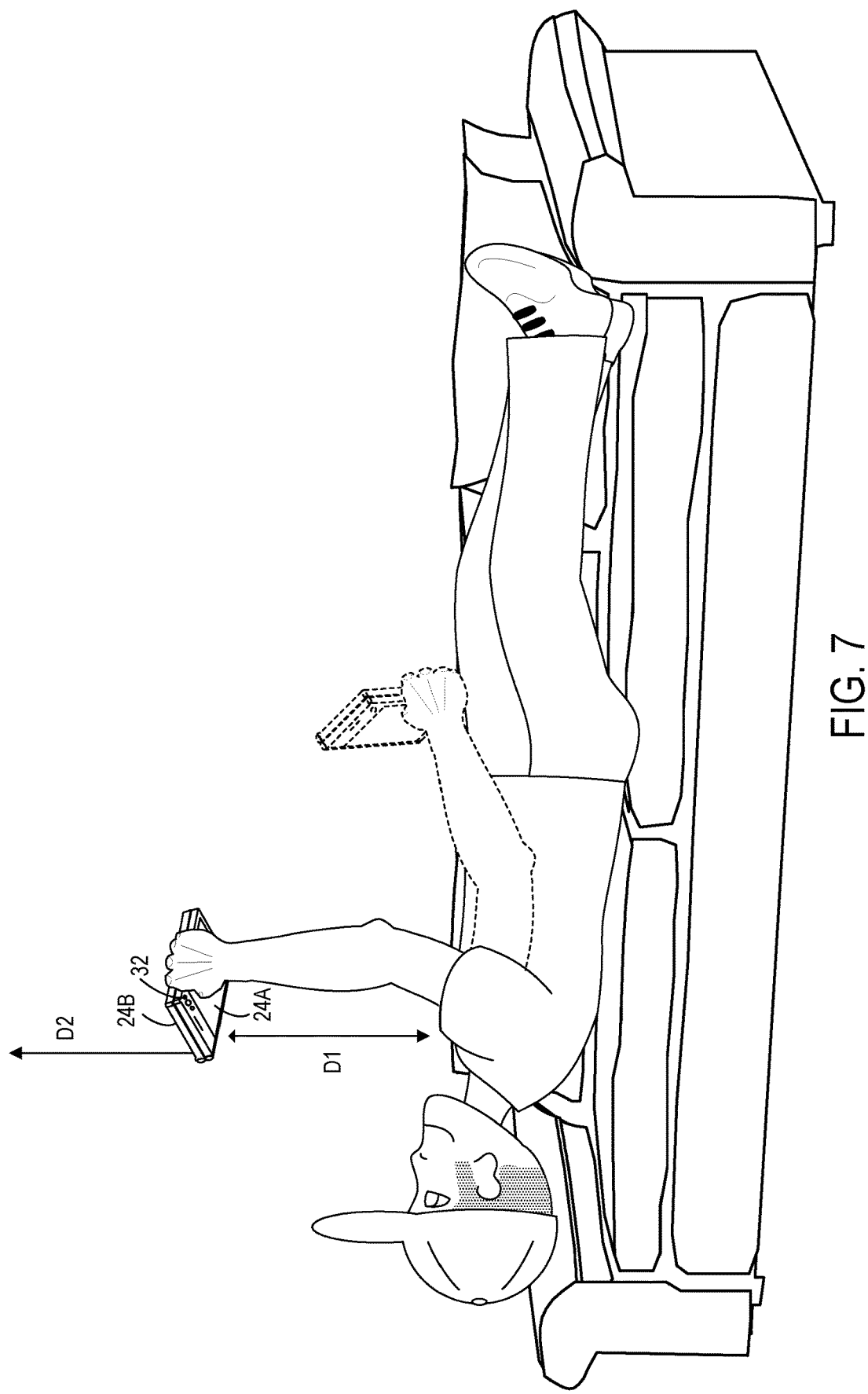
FIG. 7 shows an example depth camera input for the mobile computing device of FIG. 1.

Turning to FIG. 7, the mobile computing device 12 may include a depth camera 32 as one of the sensor devices 20. In the illustrated example, each display device of the pair of display devices 24A and 24B has an associated depth camera 32 facing in the same direction as the screen of the corresponding display device. Thus, if the user 60 is currently viewing the display device 24A, a depth camera 32 associated with the display device 24A may detect a surface of the user 60 in front of the display device 24A. On the other hand, as the user is not viewing the display device 24B, and is thus not in front of the display device 24B, then the depth camera 32 associated with the display device 24B would not detect a surface of the user 60.

For example, the associated depth camera 32 for the first display device, display device 24A in the example of FIG. 7, may detect that there is an object located at a distance D1 from the mobile computing device 12. Additionally, the associated depth camera for the second display device, display device 24B in this example, may detect that there is an object located at a distance D2 from the mobile computing device 12. The depth data may then be sent to the depth module 50 as depth camera data 76 included in the sensor data 54. The depth module 50 may then be configured to process the depth camera data 76 to determine whether the depth data includes depth values within a threshold depth value. For example, the depth module 50 may process the depth camera data 76 to determine whether any of the depth values in the depth camera data are approximately an arm's length away from the mobile computing device 12, which may likely be a surface of the user 60.

In the example illustrated in FIG. 7, the depth module 50 determines that a depth value for the distance D1 was detected by the depth camera 32 associated with the first display device, display device 24A in this example. The distance D1 may be less than an arm's length, such as two feet. Thus, the depth module 50 may determine that the object detected by the depth camera 32 at a distance D1 from the mobile computing device 12 is likely to be a surface of the user 60 who is currently viewing the first display device. On the other hand, the depth module 50 may determine that a depth value for the distance D2 detected by the depth camera 32 associated with the second display device, display device 24B in this example, is longer than an arm's length. For example, the closest object or surface to the second display device in the example of FIG. 7 may be a ceiling in the user's room. Thus, as the distance D2 detected by the depth camera 32 associated with the second display device is much longer than an arm's length distance, the depth module 50 may determine that a user is not located on that particular side of the mobile computing device, and thus determine that the user 60 is not currently viewing the second display device.

In the manner discussed above, to determine the current user focus 58, the processor 16 is further configured to detect a first depth image of a surrounding in front of the first display device and a second depth image of a surrounding in front of the second display device. Each depth image may include a plurality of depth values for surfaces detected by the depth camera 32. The depth images are sent to depth module 50 as depth camera data 76, which is processed to determine whether any of the depth values of each depth image are within a depth threshold, such as an arm's length distance. The processor 16 is further configured to determine that the first depth image includes depth values within a depth threshold and that the second depth image does not include depth values within the depth threshold. In the example illustrated in FIG. 7, the depth camera 32 for the first display device detects an object located at a distance D1 from the mobile computing device 12, and the processor 16 determines that the distance D1 is within the depth threshold having a value of approximately an arm's length, such as two feet. Accordingly, based on at least determining that the first depth image includes depth values within the depth threshold, the processor 16 is configured to determine that the first display device has the current user focus 58. Additionally, in the example illustrated, the depth camera 32 for the second display device detects an object located at a distance D2 from the mobile computing device 12, and the processor 16 determines that the distance D2 is longer than the depth threshold. Accordingly, based on at least determining that the second depth image does not include depth values within the depth threshold, the processor 16 is configured to determine that the second display device does not have the current user focus 58.

However, in some examples, there may be objects located within the depth threshold from both display devices of the pair of display devices 24A and 24B. For example, the user 60 may be viewing the first display device, and is thus detected as being within an arm's length of the first display device. However, the user may be facing toward a wall that is within the depth threshold distance away from the second display device facing the opposite direction of the first display device. Consequently, as the processor 16 determines that there are surfaces or objects located within the depth threshold for both display devices of the pair of display devices 24A and 24B, the processor 16 may not be able to determine with a high confidence which particular display device has the current user focus 58. In such a scenario, the processor 16 may be configured to utilize other sensor devices 20 to determine the current user focus 58.

Figure 8:
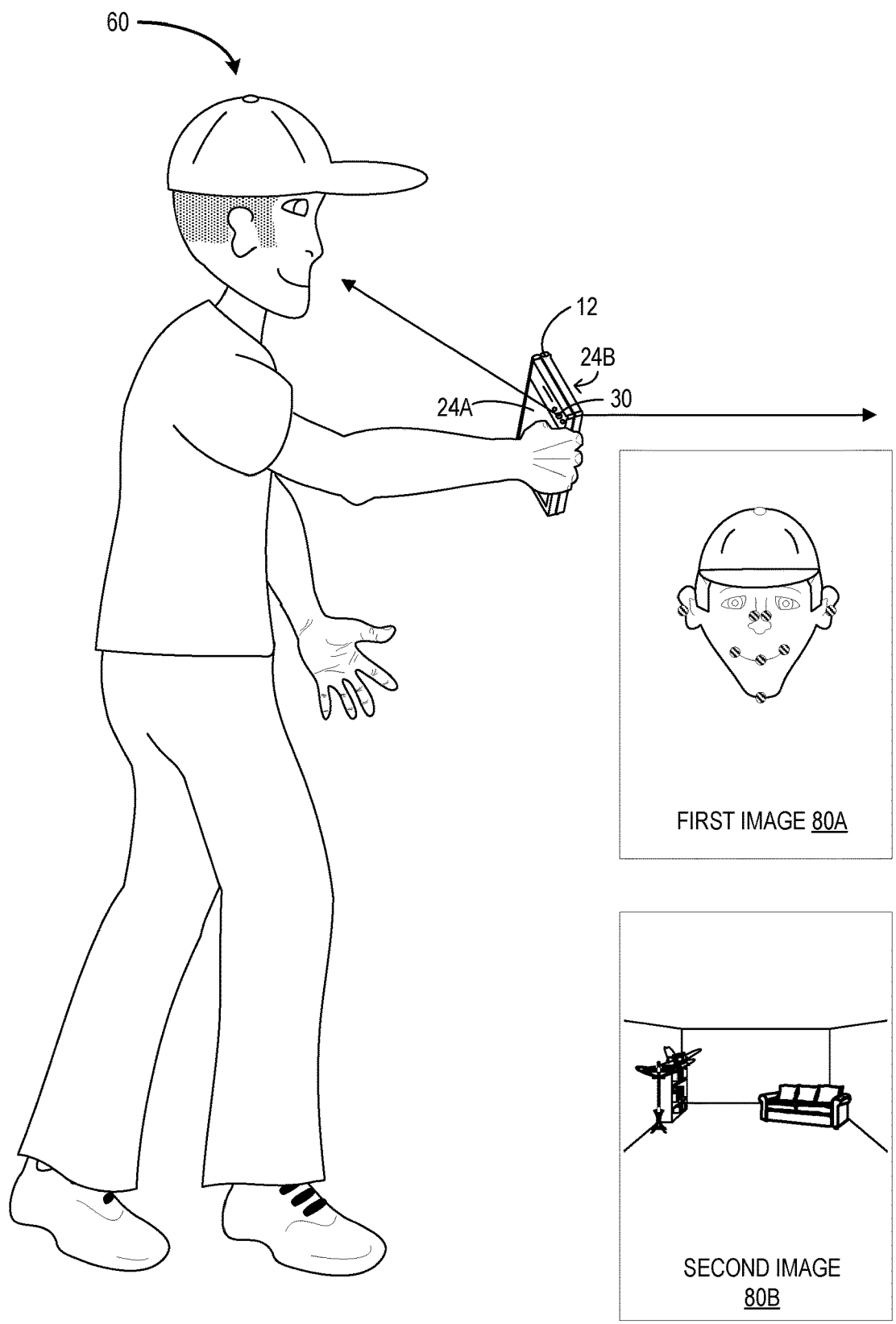
FIG. 8 shows an example face recognition input for the mobile computing device of FIG. 1.

Turning to FIG. 8, the example mobile computing device 12 further includes a camera, which, for example, may take the form of a forward facing camera 30. In the illustrated example, the user 60 is holding the mobile computing device 12 with the first display device, display device 24A in this example, facing toward the user's face as the user 60 is viewing the first display device. Thus, the forward facing camera 30 that is facing in the same direction as the first display device is also facing toward the user's 60 face. Accordingly, the forward facing camera 30 of the sensor devices 20 of the mobile computing device 12 may be configured to take a picture of the surroundings in front of the first display device, which in this example would include the user's 60 face. The picture taken by the forward facing camera 30 is sent to the facial recognition module 52 as face detection data 78 included in the sensor data 54. The facial recognition module 52 of the computer program 38 executed by the processor 16 may be configured to process and analyze the face detection data 78 for any objects that match a human facial profile. It will be appreciated that the facial recognition module 52 may utilize any suitable face recognition processes to detect human facial features in the image taken by the forward facing camera 30. Thus, in the example illustrated in FIG. 8, the image taken by the forward facing camera 30 associated with the first display device is processed by the facial recognition module 52, and the user's 60 face is detected, and thus it is determined that the current user focus 58 is on the first display device.

On the other hand, an image taken by a forward facing camera 30 associated with the second display device, display device 24B in this example, that is facing away from the user 60 would not include the user's face. Thus, the facial recognition module 52 would not detect a face, and the processor 16 may determine that the current user focus 58 is not on the second display device.

In one example, to determine the current user focus 58, the processor 16 is further configured to detect a first image 80A of a surrounding in front of the first display device and a second image 80B of a surrounding in front of the second display device. In the example illustrated in FIG. 8, the first image 80A is taken by a forward facing camera 30 associated with the first display device, display device 24A in this example. The second image 80B is taken by a forward facing camera 30 associated with the second display device, display device 24B in this example, facing away from the first display device and the user 60. The first image 80A and the second image 80B are sent to the facial recognition module 52, which is configured to process the first image 80A and the second image 80B to detect facial features. Next, based on at least detecting facial features in the first image 80A, the processor 16 is configured to determine that the first display device has the current user focus 58, and based on at least detecting no facial features in the second image, determine that the second display device does not have the current user focus 58. In the illustrated example, the first image 80A was taken by the forward facing camera 30 facing toward the user 60, and thus includes the user's 60 face, while the second image 80B was taken by the forward facing camera 30 facing away from the user 60, and thus includes the surroundings but not the user's 60 face. Accordingly, the processor 16 may determine that the first display device associated with the first image 80A has the current user focus 58 with a high degree of confidence.

Turning back to FIG. 1, in some scenarios, the processor 16 may not be able to determine the current user focus 58 with a high degree of confidence based on sensor data received from a single type of sensor. That is, in some examples, the processor 16 may not be able to determine the current user focus 58 with a high degree of confidence based on only accelerometer data, or only ambient light data 68, or only touch input data 70, or only depth camera data 76. While the processor 16 can determine the current user focus 58 with a high degree of confidence based on the face detection data 78, it will be appreciated that operating a forward facing camera and performing facial recognition analysis require more power and computational resources than detecting signature gesture inputs based on accelerometer data. Accordingly, in one example, the mobile computing device is configured to successively power on sensor devices and process sensor data from each of those sensor devices to determine the current user focus 58.

For example, to determine the current user focus 58, the processor 16 may calculate an aggregate confidence value

80 of a particular candidate user focus. Thus, when determining the current user focus 58, the processor 16 may be configured to begin processing with accelerometer data, which requires less power and processing resources than other sensor devices such as an RGB camera. The processor 16 may then determine a signature gesture confidence value 82, representing a calculated likelihood that a candidate user focus determined based on detecting the signature gesture input such as the flick gesture input 64, is correct. If the signature gesture confidence value 82 is not greater than a threshold confidence value, then the processor 16 may be configured to aggregate the signature gesture confidence value 82 into the aggregate confidence value 80.

Next, the processor 16 may power up the ambient light sensor 28 and determine an ambient light confidence value 82 representing a calculated likelihood that a candidate user focus determined based on the ambient light data 68 according to the methods discussed above is correct. The ambient light confidence value 84 may then be aggregated into the aggregate confidence value 80. If the new aggregate confidence value 80 is greater than a threshold confidence value, then the processor 16 may determine the current user focus 58 based on the combination of the accelerometer data and the ambient light data. However, if the new aggregate confidence value 80 is not greater than a threshold confidence value, then the processor 16 may proceed to power up an additional sensor device and determine a confidence value for a candidate user focus based on data received from the additional sensor device.

Similarly, each of the sensor devices 20, such as accelerometers, ambient light sensors, capacitive touch sensors, depth cameras, and forward facing cameras, can each be successively powered on. That is, the aggregate confidence value 80 may successively aggregate confidence values for a candidate user focus determined based on each type of sensor data, including a signature gesture confidence value, an ambient light confidence value, a touch input confidence value, a depth confidence value, and a face detecting confidence value, until the aggregate confidence value 80 is greater than a threshold confidence value. When the aggregate confidence value 80 is greater than the threshold confidence value, the processor 16 may be configured to determine that the current user focus is the candidate user focus.

It will be appreciated that the sensor devices 20 may each be powered up successively, or in some examples, concurrently until the current user focus 58 is determined. For example, the capacitive touch sensors may already be powered on and receiving touch data for an application being executed. Thus, the current user focus 58 may be determined based on both the accelerometer data and the touch input data 70 without needing to successively power on either sensor device. Additionally, in this example, the forward facing camera 30 may not currently be in use, and may thus be turned off. However, if the aggregate confidence value 80 for a candidate user focus determined based on the accelerometer data and the touch input data 70 is not greater than a threshold confidence value, then the processor 16 may be configured to power the forward facing camera 30 on and perform facial recognition according to the methods discussed above.

In one example, the mobile computing device 12 includes two or more sensor devices including a first sensor and a second sensor, the first sensor consuming less power than the second sensor. For example, the sensor devices may include a first sensor that is an accelerometer 26 and a second sensor that is a depth camera 32, where the accelerometer 28 consumes less power than running the depth camera 32. In this example, to determine the current user focus 58, the processor 16 is configured to receive a first signal from the first sensor and determine a candidate user focus based on the first signal at a first computed confidence level. For example, the first sensor may be an accelerometer, the first signal may be accelerometer data included in the sensor data 54, and the candidate user focus may be determined based on detecting the signature gesture input such as the flick gesture input 64 based on the accelerometer data. The processor 16 may then calculate a first computed confidence level, such as the signature gesture confidence value 82 indicating a likelihood that the candidate user focus determined based on the accelerometer data is correct.

Next, the processor 16 is configured to determine that the first computed confidence value does not exceed a predetermined threshold, and in response to this determination, powering up the second sensor. That is, if the first computed confidence level, the signature gesture confidence value 82 in this example, is not greater than a threshold confidence value, then the processor 16 is configured to power up a second sensor, such as the depth camera 32. The processor 16 is further configured to receive a second signal from the second sensor, and determine the candidate user focus based on the second signal and the first signal at a second computed confidence level. For example, the second signal may be the depth camera data received via the depth camera 32, and the candidate user focus is determined according to the depth camera methods discussed above. The processor 16 determines a depth confidence value 88 indicating a likelihood that the candidate confidence value determined based on the depth camera data 76 is correct. The processor 16 then aggregates the signature gesture confidence value 82 and the depth confidence value 88 into the aggregate confidence value 80.

Next, the processor 16 is configured to determine whether the second computed confidence level exceeds the predetermined threshold, and if so, determine that the current user focus 58 is the candidate user focus. That is, the processor 16 determines whether the aggregate confidence value 80, which includes the signature gesture confidence value and the depth camera confidence value, is greater than a threshold confidence value. It will be appreciated that the confidence values are not necessarily aggregated with a uniform weighting. For example, the processor 16 may be configured to place more confidence on the depth camera data than the accelerometer data. If the second computed confidence level, the aggregate confidence value 80 in this example, is greater than the threshold confidence value, then the processor 16 is configured to perform a predetermined action, such as, for example, reducing a power usage of a display device that does not have the current user focus 58.

It will be appreciated that more than two sensor devices may be successively powered on in the above manner. For example, if the second computed confidence level does not exceed the predetermined confidence threshold, then the processor 16 may be configured to power up a third sensor, such as the forward facing camera 30, and receive a third signal from the third sensor, and determine a candidate user focus based on the third signal, the second signal, and the first signal, at a third computed confidence level. That is, the processor 16 may compute an aggregate confidence value 80 that aggregates the signature gesture confidence value 82, the touch input confidence value 86, and the face detection confidence value 90, and determine whether that aggregate confidence value 80 exceeds the threshold confidence level. It will be appreciated that this process may be successively repeated for all sensor devices included in the sensor devices 20 until the aggregate confidence value 80 exceeds the threshold confidence level and a current user focus 58 can be determined with a high confidence level. The particular order of sensor devices 20 to be successively powered on may be predetermined based on an expected power consumption of that sensor device and an expected processing resource usage to process sensor data 54 for that sensor device.

Figure 9:
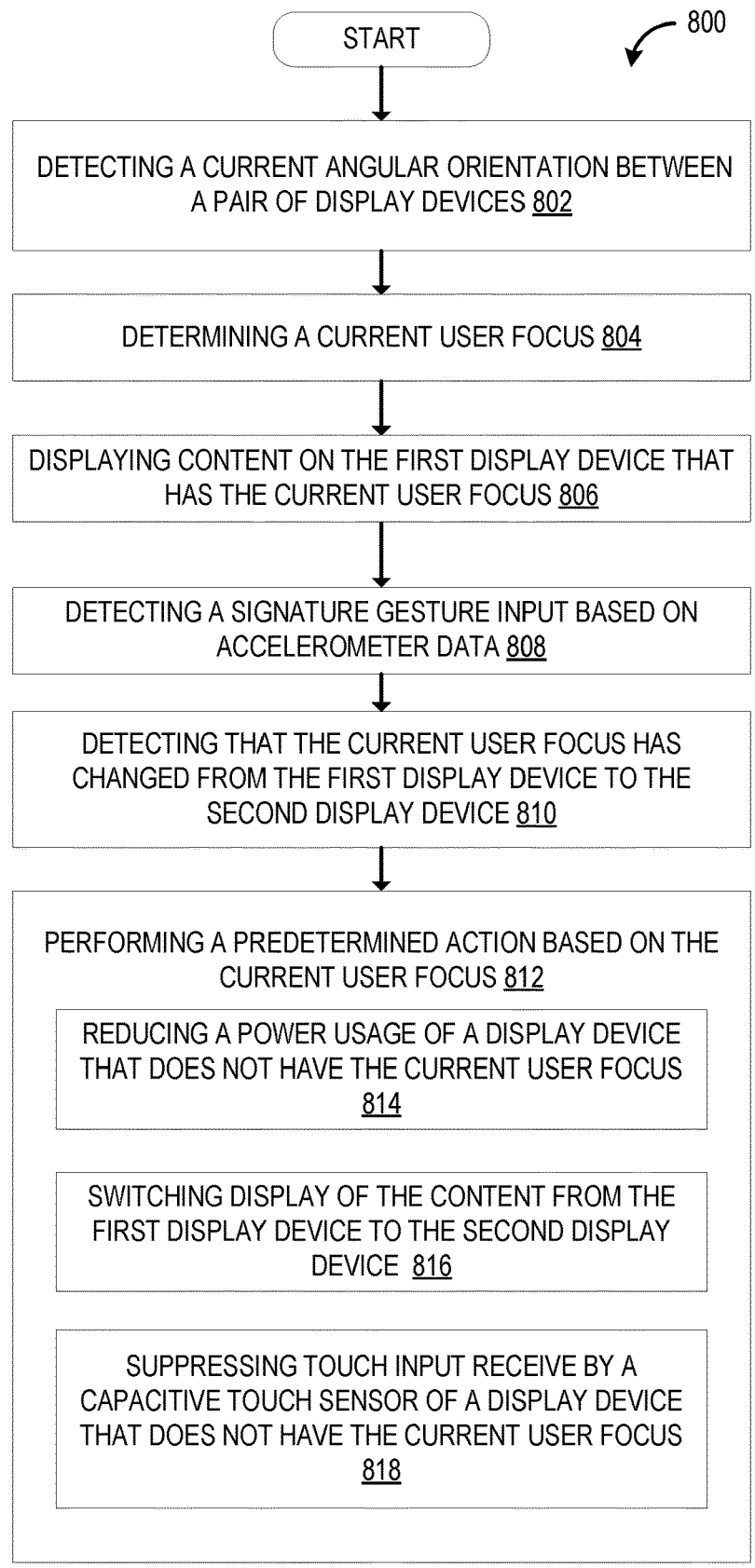
FIG. 9 shows an example method for detecting user focus on a multi-screen device using the mobile computing device of FIG. 1.

FIG. 9 shows an example computer-implemented method 800 according to an embodiment of the present disclosure. At step 802, the method 800 may include detecting a current angular orientation 56 between a pair of display devices 24A and 24B indicating that the pair of display devices are facing away from each other. In one example, the method 800 is implemented on a mobile computing device 12 that includes a housing 14 including a processor 16, sensor devices 20, and two or more display devices 24, the housing 14 including a hinge 36 between a pair of display devices 24A and 24B of the two or more display devices 24, the hinge 36 being configured to permit the pair of display devices to rotate between angular orientations from a face-to-face angular orientation to a back-to-back angular orientation. The current angular orientation between the pair of display devices may be detected through several methods. For example, the processor 16 may be configured to determine the current angular orientation based on accelerometer data received via accelerometers as the user applied force to the housing to rotate the display devices relative to each other. In another example, the hinge 36 may include a hinge sensor that is configured to detect a current angular orientation of the hinge 36.

Advancing from step 802 to step 804, the method 800 may include determining a current user focus 58 indicating that a first display device of the pair of display devices 24A and 24B is being viewed by the user, and that a second display device of the pair of display devices is not being viewed by the user. The current user focus may be determined by the processor 16 based on methods and processes described above and in FIG. 10. It will be appreciated that in examples where the pair of display devices have a back-to-back angular orientation, the user may generally only view one display device at a time. Thus if one display device of the pair of display devices has the current user focus, then the other display device does not have the current user focus.

Proceeding from step 804 to step 806, the method 800 may include displaying content 66 on the first display device that has the current user focus 58. The content displayed on the first display device may be content from any application executed on the mobile computing device 12. For example, the content may be a movie being played by a media player application program executed on the mobile computing device 12.

Advancing from step 806 to step 808, the method 800 may include detecting a signature gesture input based on accelerometer data received via an accelerometer 26 detecting that a mobile computing device 12 including the pair of display devices 24A and 24B has been rotated more than a threshold degree. As discussed above, the signature gesture input includes a flick gesture input 64 that may be detected based on the accelerometer data included in the sensor data 54 indicating that the mobile computing device 12 has been rotated around a longitudinal or lateral rotational axis more than a threshold degree. The threshold degree may be set for a desired sensitivity, such as, for example, one hundred and twenty degrees. However, it will be appreciated that other suitable threshold degrees may also be used.

Proceeding from step 808 to step 810, method 800 may include determining that the current user focus 58 has changed from the first display device to the second display device based on at least detecting the signature gesture input. In one example, the signature gesture input is the flick gesture input 64 which results in the mobile computing device 12 being flipped to an opposite side. Thus, if the first display device had the current user focus, after the flick gesture input, the first display device will now be facing away from the user while the second display device will now be facing toward the user. Thus, the current user focus 58 will switch from the first display device to the second display device.

Advancing from step 810 to step 812, the method 800 may include performing a predetermined action based on the current user focus 58. The predetermined action may include a plurality of different predetermined actions. In one example, step 812 includes substep 814 including reducing a power usage of a display device that does not have the current user focus. Reducing a power usage may include either completely powering down a display device that does not have the current user focus, or dimming or otherwise reducing a power usage of the display device.

In another example, step 812 may include substep 816, including based on at least determining that the current user focus 58 has changed from the first display device to the second display device, switching display of the content 66 from the first display device to the second display device. As discussed above, the current user focus has switched from the first display device to the second display device. In one example, the display content is a movie being presented on the mobile computing device 12. Thus, in order to not degrade the user experience of the movie content, and allow the user to continue viewing the movie on the second display screen, the processor 16 is configured to switch display of the content from the first display device to the second display device upon detecting the flick gesture input indicating that the user has flipped the mobile computing device to the other side and is now intending to view the second display device.

In another example, step 812 may include substep 818, including suppressing touch input received by a capacitive touch sensor of a display device that does not have the current user focus. In some examples, the user may be gripping the mobile computing device by the back. That is, the user may be viewing the first display device while gripping the mobile computing device 12 by the sides and the second display device that is facing away from the first display device. Thus, any touch inputs to the second display device resulting from the user's grip are likely to be unintentional. Accordingly, the processor 16 is configured to suppress or ignore those unintended touch inputs to the display device that does not have the current user focus.

Figure 10:
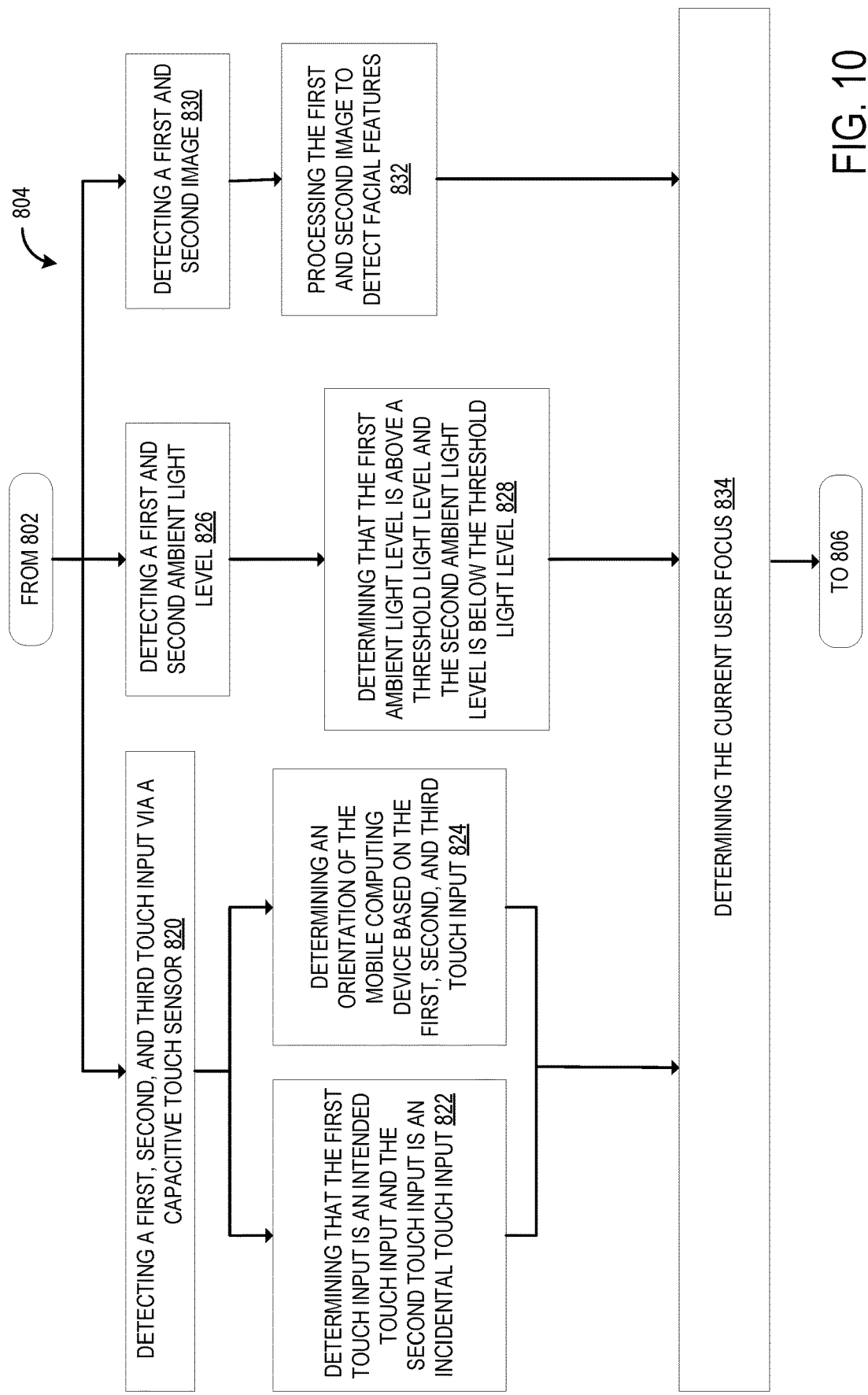
FIG. 10 continues the example method for detecting user focus of FIG. 9.

Now turning to FIG. 10, step 804 may further include substeps 820 through substeps 834. In one example, the pair of display devices each include a capacitive touch sensor configured to receive touch input. In this example, the step 804 proceeds to substep 820, and the method 800 may include detecting a first touch input via a capacitive touch sensor of the first display device and a second touch input via a capacitive touch sensor of the second display device. Further in this example, a side of the mobile computing device includes a capacitive touch sensor configured to receive touch input. In this example, substep 820 further includes detecting a third touch input via a capacitive touch sensor of the side of the mobile computing device. The first, second, and third touch inputs may be detected via a capacitive grid integrated into each of the display devices. The capacitive grid may detect any changes in capacitance in the grid resulting from a user's finger, palm, or other parts of the user's skin, or a capacitive object such as a stylus. The capacitive data from the capacitive touch sensors is processed by the processor 16 to classify the capacitive data as various touch inputs.

Advancing from substep 820 to substep 822, the method 800 may include determining that the first touch input is an intended touch input and the second touch input is an incidental touch input. In one example, the touch inputs may be classified into intended touch inputs and incidental touch inputs based on characteristics of the touch inputs such as size, shape, total capacitance, etc. Advancing from substep 822 to substep 834, the method 800 may include determining the current user focus. For example, the substep 834 may include, based on at least determining that the first touch input is an intended touch input, determining that the first display device has the current user focus, and based on at least determining that the second touch input is an incidental touch input, determining that the second display device does not have the current user focus. As discussed above, the user is likely to enter intended touch inputs to the same display device that the user is currently viewing. While incidental touch inputs to the second display device resulting from the user gripping the back of the mobile computing device may indicate that the user is not currently viewing the second display device.

In another example, step 804 may proceed from substep 820 to substep 824, and may include determining an orientation of the mobile computing device based on at least the first touch input, the second touch input, and the third touch input. The processor 16 may determine the orientation of the mobile computing device 12, or how the user is currently holding the mobile computing device 12, based on the types and locations of the first, second, and third touch inputs. For example, if the first touch input is an intended touch input to the first display device, the second touch input is an incidental touch input to the second display device facing away from the first display device, and the third touch input is an incidental palm touch input to the left side of the mobile computing device, the processor 16 may determine that the user is currently holding the mobile computing device with the user's left hand, and entering touch inputs to the first display device via a thumb of the left hand or a finger of the right hand. In this example, the method 800 advancing from substep 824 to substep 834, and may include determining the current user focus based on at least the determined orientation of the mobile computing device.

In another example, the mobile computing device 12 further comprises an ambient light sensor 28. In this example, step 804 may include substep 826, including detecting a first ambient light level for a surrounding in front of the first display device and a second ambient light level for a surrounding in front of the second display device. In this example, each display device includes an associated ambient light sensor facing in the same direction as the screen of the display device. Thus, if a display device is face down on a table, the associated ambient light sensor would also be face down on the table and would therefore detect no ambient light or at least less ambient light than an ambient light sensor facing upwards away from the table. Advancing from substep 826 to substep 828, the method 800 may include determining that the first ambient light level is above a threshold light level and that the second ambient light level is below the threshold light level. The threshold light level may be set to any suitable light level to differentiate from an ambient light sensor being blocked by a surface and an ambient light sensor that is unblocked and able to detect the ambient light in a room. Proceeding from substep 828 to substep 834, the method 800 may include determining the current user focus 834. For example, the substep 834 may include, based on at least determining that the first ambient light level is above the threshold light level, determining that the first display device has the current user focus, and based on at least determining that the second ambient light level is below the threshold light level, determining that the second display device does not have the current user focus. In this example, an ambient light sensor detecting an ambient light level below the light threshold may indicate that the associated display device is facing toward and being blocked by a surface, such as a table, and is thus unlikely to be currently being viewed by the user. Conversely, an ambient light sensor detecting an ambient light level above the light threshold may indicate that the associated display device is facing toward the open room, and is thus more likely to have the current user focus 58.

In another example, the mobile computing device further comprises a camera. In this example, step 804 may include substep 830, including detecting a first image of a surrounding in front of the first display device and a second image of a surrounding in front of the second display device. In this example, each display device may include an associated forward facing camera 30 that is facing the same direction as the screen of the display device. Thus, the image taken by a forward facing camera reflects what is in front of the associated display device. Accordingly, the first image includes the objects in front of the first display device, and the second image includes the object in front of the second display device. Proceeding from substep 830 to substep 832, the method 800 may include processing the first image and the second image to detect facial features. The images may be processed via any suitable facial recognition algorithms. In one example, the processor 16 analyzes the images to detect any human facial features. In another example, the processor 16 analyzes the images to detect a specific user's facial features to distinguish the user from any other people that may be in view of the forward facing cameras of the display device. Advancing from substep 832 to substep 834, the method 800 may include determining the current user focus 58. In this example, substep 834 may further include, based on at least detecting facial features in the first image, determining that the first display device has the current user focus, and based on at least detecting no facial features in the second image, determining that the second display device does not have the current user focus. By detecting human facial features in front of the first display device based on the first image taken by the associated forward facing camera, the processor 16 may determine with a high confidence that the user is currently viewing the first display device.

After determining the current user focus 834, the method 800 may proceed to step 806, and advance through the method steps illustrated in FIG. 9 and discussed above.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
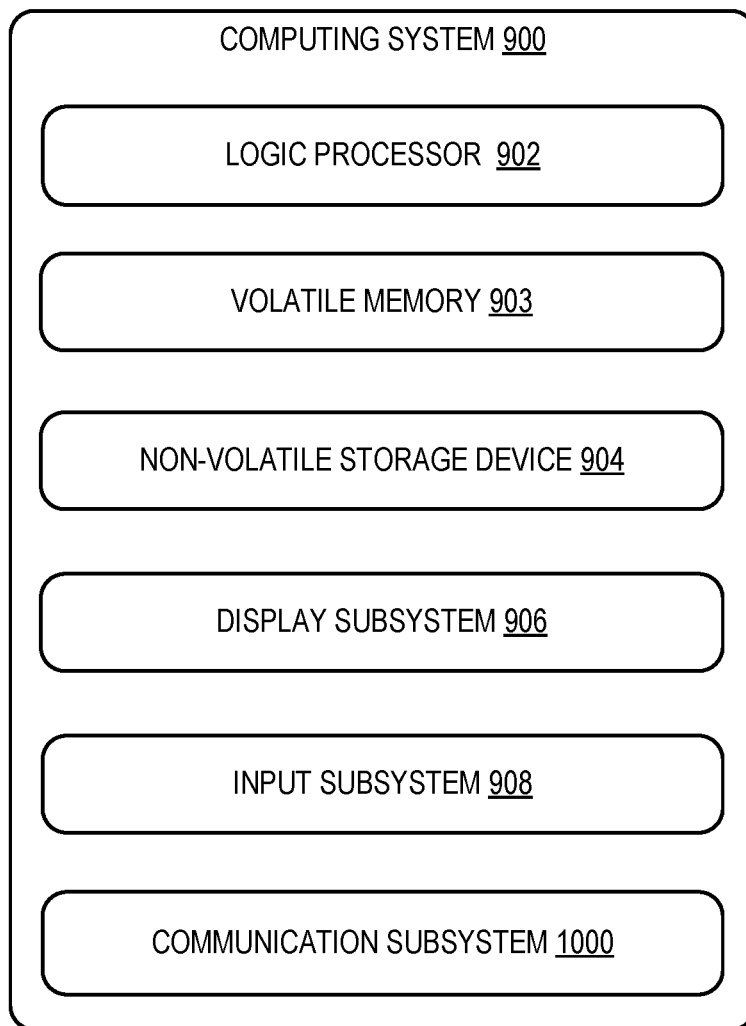
FIG. 11 shows an example computing system according to an embodiment of the present description.

FIG. 11 schematically shows a non-limiting embodiment of a computing system 900 that can enact one or more of the methods and processes described above. Computing system 900 is shown in simplified form. Computing system 900 may embody the mobile computing device 12 of FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 903, and a non-volatile storage device 904. Computing system 900 may optionally include a display subsystem 906, input subsystem 908, communication subsystem 1000, and/or other components not shown in FIG. 11.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processors to implement the methods and processes described herein. When such methods and processes are implemented, the state of non-volatile storage device 904 may be transformed—e.g., to hold different data.

Non-volatile storage device 904 may include physical devices that are removable and/or built-in. Non-volatile storage device 94 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a mobile computing device comprising a processor, an accelerometer, two or more display devices, and a housing including the processor, the accelerometer, and the two or more display devices, the housing including a hinge between a pair of display devices of the two or more display devices, the hinge being configured to permit the pair of display devices to rotate between angular orientations from a face-to-face angular orientation to a back-to-back angular orientation, the processor being configured to detect a current angular orientation between the pair of display devices indicating that the pair of display devices are facing away from each other, determine a current user focus indicating that a first display device of the pair of display devices is being viewed by the user, and that a second display device of the pair of display devices is not being viewed by the user, detect a signature gesture input based on accelerometer data received via the accelerometer detecting that the mobile computing device has been rotated more than a threshold degree, determine that the current user focus has changed from the first display device to the second display device based on at least detecting the signature gesture input, and perform a predetermined action based on the current user focus. In this aspect, additionally or alternatively, to perform the predetermined action, the processor may be further configured to reduce a power usage of a display device that does not have the current user focus. In this aspect, additionally or alternatively, the processor may be further configured to display content on the first display device that has the current user focus, and wherein to perform the predetermined action, the processor may be further configured to, based on at least determining that the current user focus has changed from the first display device to the second display device, switch display of the content from the first display device to the second display device. In this aspect, additionally or alternatively, the processor may be further configured to execute one or more application programs, and wherein to perform the predetermined action, the processor may be further configured to send the current user focus to the one or more application programs. In this aspect, additionally or alternatively, to determine the current user focus, the processor may be further configured to detect a first touch input via a capacitive touch sensor of the first display device and a second touch input via a capacitive touch sensor of the second display device, determine that the first touch input is an intended touch input and the second touch input is an incidental touch input, based on at least determining that the first touch input is an intended touch input, determine that the first display device has the current user focus, and based on at least determining that the second touch input is an incidental touch input, determine that the second display device does not have the current user focus. In this aspect, additionally or alternatively, to perform the predetermined action, the processor may be further configured to suppress touch input received by a capacitive touch sensor of a display device that does not have the current user focus. In this aspect, additionally or alternatively, to determine the current user focus, the processor may be further configured to detect a third touch input via a capacitive touch sensor of a side of the mobile computing device, determine an orientation of the mobile computing device based on at least the first touch input, the second touch input, and the third touch input, and determine the current user focus based on at least the determined orientation of the mobile computing device. In this aspect, additionally or alternatively, to determine the current user focus, the processor may be further configured to detect a first ambient light level for a surrounding in front of the first display device via a first ambient light sensor and a second ambient light level for a surrounding in front of the second display device via a second ambient light sensor, determine that the first ambient light level is above a threshold light level and that the second ambient light level is below the threshold light level, based on at least determining that the first ambient light level is above the threshold light level, determine that the first display device has the current user focus, and based on at least determining that the second ambient light level is below the threshold light level, determine that the second display device does not have the current user focus. In this aspect, additionally or alternatively, to determine the current user focus, the processor may be further configured to detect a first image of a surrounding in front of the first display device via a first camera and a second image of a surrounding in front of the second display device via a second camera, process the first image and the second image to detect facial features, based on at least detecting facial features in the first image, determine that the first display device has the current user focus, and based on at least detecting no facial features in the second image, determine that the second display device does not have the current user focus. In this aspect, additionally or alternatively, to determine the current user focus, the processor may be further configured to detect a first depth image of a surrounding in front of the first display device via a first depth camera and a second depth image of a surrounding in front of the second display device via a second depth camera, determine that the first depth image includes depth values within a depth threshold and that the second depth image does not include depth values with the depth threshold, based on at least determining that the first depth image includes depth values within the depth threshold, determine that the first display device has the current user focus, and based on at least determining that the second depth image does not include depth values within the depth threshold, determine that the second display device does not have the current user focus. In this aspect, additionally or alternatively, to detect the signature gesture input, the processor may be further configured to detect a rotation axis around which the mobile computing device has been rotated more than the threshold degree based on accelerometer data received via the accelerometer, and detect the signature gesture input based on at least detecting a longitudinal or lateral rotation axis.

Another aspect provides a computer-implemented method comprising detecting a current angular orientation between a pair of display devices indicating that the pair of display devices are facing away from each other, determining a current user focus indicating that a first display device of the pair of display devices is being viewed by the user, and that a second display device of the pair of display devices is not being viewed by the user, detecting a signature gesture input based on accelerometer data received via an accelerometer detecting that a mobile computing device including the pair of display devices has been rotated more than a threshold degree, determining that the current user focus has changed from the first display device to the second display device based on at least detecting the signature gesture input, and performing a predetermined action based on the current user focus. In this aspect, additionally or alternatively, performing the predetermined action may include reducing a power usage of a display device that does not have the current user focus. In this aspect, additionally or alternatively, the computer-implemented method may further comprise displaying content on the first display device that has the current user focus, and wherein performing the predetermined action may include, based on at least determining that the current user focus has changed from the first display device to the second display device, switching display of the content from the first display device to the second display device. In this aspect, additionally or alternatively, determining the current user focus may further include detecting a first touch input via a capacitive touch sensor of the first display device and a second touch input via a capacitive touch sensor of the second display device, determining that the first touch input is an intended touch input and the second touch input is an incidental touch input, based on at least determining that the first touch input is an intended touch input, determining that the first display device has the current user focus, and based on at least determining that the second touch input is an incidental touch input, determining that the second display device does not have the current user focus. In this aspect, additionally or alternatively, performing the predetermined action may include suppressing touch input received by a capacitive touch sensor of a display device that does not have the current user focus. In this aspect, additionally or alternatively, determining the current user focus may further include detecting a third touch input via a capacitive touch sensor of a side of the mobile computing device, determining an orientation of the mobile computing device based on at least the first touch input, the second touch input, and the third touch input, and determining the current user focus based on at least the determined orientation of the mobile computing device. In this aspect, additionally or alternatively, determining the current user focus may further include detecting a first ambient light level for a surrounding in front of the first display device via a first ambient light sensor and a second ambient light level for a surrounding in front of the second display device via a second ambient light sensor, determining that the first ambient light level is above a threshold light level and that the second ambient light level is below the threshold light level, based on at least determining that the first ambient light level is above the threshold light level, determining that the first display device has the current user focus, and based on at least determining that the second ambient light level is below the threshold light level, determining that the second display device does not have the current user focus. In this aspect, additionally or alternatively, determining the current user focus may further include detecting a first image of a surrounding in front of the first display device via a first camera and a second image of a surrounding in front of the second display device via a second camera, processing the first image and the second image to detect facial features, based on at least detecting facial features in the first image, determining that the first display device has the current user focus, and based on at least detecting no facial features in the second image, determining that the second display device does not have the current user focus.

Another aspect provides a mobile computing device comprising a processor, two or more sensor devices including a first sensor and a second sensor, the first sensor consuming less power than the second sensor, two or more display devices, and a housing including the processor, the two or more sensor devices, and the two or more display devices, the housing including a hinge between a pair of display devices of the two or more display devices, the hinge being configured to permit the pair of display devices to rotate between angular orientations from a face-to-face angular orientation to a back-to-back angular orientation, the processor being configured to detect a current angular orientation between the pair of display devices indicating that the pair of display devices are facing away from each other, determine a current user focus indicating that a first display device of the pair of display devices is being viewed by the user, and that a second display device of the pair of display devices is not being viewed by the user, where to determine the current user focus, the processor is configured to receive a first signal from the first sensor and determine a candidate user focus based on the first signal at a first computed confidence level, determine that the first computed confidence value does not exceed a predetermined threshold, and in response to this determination, powering up the second sensor, receive a second signal from the second sensor, determine the candidate user focus based on the second signal and the first signal at a second computed confidence level, and determine whether the second computed confidence level exceeds the predetermined threshold, and if so, determine that the current user focus is the candidate user focus, and reduce a power usage of a display device that does not have the current user focus.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A mobile computing device comprising:
   a processor;
   a pair of display devices including a first display device and a second display device arranged to face away from each other;
   the processor being configured to:
      detect a first touch input via a capacitive touch sensor of the first display device of the pair of display devices, a second touch input via a capacitive touch sensor of the second display device of the pair of display devices, and a third touch input via a capacitive touch sensor of a side of the mobile computing device;
      determine an orientation of the mobile computing device based on a detected pattern of the first touch input, the second touch input, and the third touch input;
      determine which display device of the pair of display devices has a current user focus based on at least the determined orientation of the mobile computing device; and
      perform a predetermined action based on the current user focus.

2. The mobile computing device of claim 1, wherein to perform the predetermined action, the processor is further configured to reduce a power usage of a display device that does not have the current user focus.

3. The mobile computing device of claim 1, wherein the processor is further configured to display content on the first display device that has the current user focus; and
wherein to perform the predetermined action, the processor is further configured to, based on at least determining that the current user focus has changed from the first display device to the second display device, switch display of the content from the first display device to the second display device.

4. The mobile computing device of claim 1, wherein the processor is further configured to execute one or more application programs; and
wherein to perform the predetermined action, the processor is further configured to send the current user focus to the one or more application programs.

5. The mobile computing device of claim 1, wherein to determine the orientation of the mobile computing device based on the detected pattern, the processor is further configured to:
determine that the first touch input is an intended touch input and the second touch input is an incidental touch input; and
determine the orientation of the mobile computing device based on the detected pattern of the intended touch input, the incidental touch input, and the third touch input.

6. The mobile computing device of claim 5, wherein to perform the predetermined action, the processor is further configured to suppress touch input received by a capacitive touch sensor of a display device that does not have the current user focus.

7. The mobile computing device of claim 1, wherein to determine an orientation of the mobile computing device based on the detected pattern, the processor is further configured to:
determine one or more patterns of touch inputs resulting from how a user holds the mobile computing device;
store the one or more patterns of touch inputs in a database; and
detect the pattern for the first touch input, the second touch input, the third touch input based on the one or more patterns of touch inputs stored in the database.

8. The mobile computing device of claim 1, wherein to determine the current user focus, the processor is further configured to:
detect a first ambient light level for a surrounding in front of the first display device via a first ambient light sensor and a second ambient light level for a surrounding in front of the second display device via a second ambient light sensor;
determine that the first ambient light level is above a threshold light level and that the second ambient light level is below the threshold light level;
based on at least determining that the first ambient light level is above the threshold light level, determine that the first display device has the current user focus; and
based on at least determining that the second ambient light level is below the threshold light level, determine that the second display device does not have the current user focus.

9. The mobile computing device of claim 1, wherein to determine the current user focus, the processor is further configured to:

detect a first image of a surrounding in front of the first display device via a first camera and a second image of a surrounding in front of the second display device via a second camera;
process the first image and the second image to detect facial features;
based on at least detecting facial features in the first image, determine that the first display device has the current user focus; and
based on at least detecting no facial features in the second image, determine that the second display device does not have the current user focus.

10. The mobile computing device of claim 1, wherein to determine the current user focus, the processor is further configured to:
detect a first depth image of a surrounding in front of the first display device via a first depth camera and a second depth image of a surrounding in front of the second display device via a second depth camera;
determine that the first depth image includes depth values within a depth threshold and that the second depth image does not include depth values with the depth threshold;
based on at least determining that the first depth image includes depth values within the depth threshold, determine that the first display device has the current user focus; and
based on at least determining that the second depth image does not include depth values within the depth threshold, determine that the second display device does not have the current user focus.

11. The mobile computing device of claim 1, further comprising an accelerometer; and
wherein the processor is further configured to:
detect a signature gesture input based on accelerometer data received via the accelerometer detecting that the mobile computing device has been rotated more than a threshold degree;
determine that the current user focus has changed between the pair of display devices based on at least detecting the signature gesture input.

12. A computer-implemented method comprising:
detecting a first touch input via a capacitive touch sensor of a first display device of a pair of display devices of a mobile computing device, a second touch input via a capacitive touch sensor of a second display device of the pair of display devices, and a third touch input via a capacitive touch sensor of a side of the mobile computing device, the pair of display devices being arranged to face away from each other;
determining an orientation of the mobile computing device based on a detected pattern of the first touch input, the second touch input, and the third touch input;
determining which display device of the pair of display devices has a current user focus based on at least the determined orientation of the mobile computing device; and
performing a predetermined action based on the current user focus.

13. The computer-implemented method of claim 12, wherein performing the predetermined action include reducing a power usage of a display device that does not have the current user focus.

14. The computer-implemented method of claim 12, further comprising:
displaying content on the first display device that has the current user focus; and wherein performing the predetermined action includes, based on at least determining that the current user focus has changed from the first display device to the second display device, switching display of the content from the first display device to the second display device.

15. The computer-implemented method of claim 12, wherein the orientation of the mobile computing device based on the detected pattern further includes:
   determining that the first touch input is an intended touch input and the second touch input is an incidental touch input; and
   determining the orientation of the mobile computing device based on the detected pattern of the intended touch input, the incidental touch input, and the third touch input.

16. The computer-implemented method of claim 15, wherein performing the predetermined action includes suppressing touch input received by a capacitive touch sensor of a display device that does not have the current user focus.

17. The computer-implemented method of claim 15, wherein determining an orientation of the mobile computing device based on the detected pattern, further comprises:
   determining one or more patterns of touch inputs resulting from how a user holds the mobile computing device;
   storing the one or more patterns of touch inputs in a database; and
   detecting the pattern for the first touch input, the second touch input, the third touch input based on the one or more patterns of touch inputs stored in the database.

18. The computer-implemented method of claim 12, wherein determining the current user focus further includes:
   detecting a first ambient light level for a surrounding in front of the first display device via a first ambient light sensor and a second ambient light level for a surrounding in front of the second display device via a second ambient light sensor;
   determining that the first ambient light level is above a threshold light level and that the second ambient light level is below the threshold light level;
   based on at least determining that the first ambient light level is above the threshold light level, determining that the first display device has the current user focus; and
   based on at least determining that the second ambient light level is below the threshold light level, determining that the second display device does not have the current user focus.

19. The computer-implemented method of claim 12, wherein determining the current user focus further includes:
   detecting a first image of a surrounding in front of the first display device via a first camera and a second image of a surrounding in front of the second display device via a second camera;
   processing the first image and the second image to detect facial features;
   based on at least detecting facial features in the first image, determining that the first display device has the current user focus; and
   based on at least detecting no facial features in the second image, determining that the second display device does not have the current user focus.

20. A mobile computing device comprising:
   a processor;
   two or more sensor devices including a first sensor and a second sensor, the first sensor consuming less power than the second sensor;
   a pair of display devices including a first display device and a second display device arranged to face away from each other;
   the processor being configured to:
      determine a current user focus indicating that the first display device of the pair of display devices is being viewed by the user, and that the second display device of the pair of display devices is not being viewed by the user, where to determine the current user focus, the processor is configured to:
         receive a first signal from the first sensor and determine a candidate user focus based on the first signal at a first computed confidence level,
         determine that the first computed confidence value does not exceed a predetermined threshold, and in response to this determination, powering up the second sensor,
         receive a second signal from the second sensor,
         determine the candidate user focus based on the second signal and the first signal at a second computed confidence level, and
         determine whether the second computed confidence level exceeds the predetermined threshold, and if so, determine that the current user focus is the candidate user focus; and
      reduce a power usage of a display device that does not have the current user focus.

* * * * *